(12) United States Patent
Kunimatsu

(10) Patent No.: US 8,120,343 B2
(45) Date of Patent: Feb. 21, 2012

(54) SWITCHING POWER SUPPLY AND SEMICONDUCTOR DEVICE USED FOR THE SAME

(75) Inventor: Takashi Kunimatsu, Kadoma (JP)

(73) Assignee: Panasonic Corporation, Osaka (JP)

( * ) Notice: Subject to any disclaimer, the term of this patent is extended or adjusted under 35 U.S.C. 154(b) by 392 days.

(21) Appl. No.: 12/472,726

(22) Filed: May 27, 2009

(65) Prior Publication Data

US 2009/0302816 A1 Dec. 10, 2009

(30) Foreign Application Priority Data

Jun. 10, 2008 (JP) .................... 2008-151151

(51) Int. Cl.
*H02M 1/36* (2007.01)

(52) U.S. Cl. .................... 323/282; 363/49; 363/50

(58) Field of Classification Search ............ 323/282; 363/49, 50
See application file for complete search history.

(56) References Cited

U.S. PATENT DOCUMENTS

| 6,294,903 B1 | 9/2001 | Yamashita et al. ............ 323/282 |
| 6,812,682 B2 | 11/2004 | Hachiya ........................ 323/284 |
| 7,321,223 B2 | 1/2008 | Hachiya ........................ 323/224 |
| 2006/0273662 A1* | 12/2006 | Hachiya et al. ............... 307/112 |
| 2007/0229148 A1* | 10/2007 | Hachiya et al. ............... 327/540 |

FOREIGN PATENT DOCUMENTS

JP 2006-325339 11/2006

* cited by examiner

*Primary Examiner* — Harry Behm

(74) *Attorney, Agent, or Firm* — Steptoe & Johnson LLP

(57) ABSTRACT

According to the present invention, it is possible to prevent an overcurrent from passing through a switching element 1 during overcurrent protection and reduce power consumption during standby while detecting an output voltage immediately after power-on and achieving soft start control without being restricted by time.

21 Claims, 10 Drawing Sheets

SWITCHING POWER SUPPLY AND SEMICONDUCTOR DEVICE USED FOR THE SAME

FIELD OF THE INVENTION

The present invention relates to a switching power supply such as a chopper-type step-down switching power supply, and a semiconductor device used for the same.

BACKGROUND OF THE INVENTION

An aspect of a switching power supply of the prior art is a chopper-type step-down switching power supply which steps down a DC voltage applied to an input terminal and outputs the voltage from an output terminal (for example, see Japanese Patent No. 3691500).

The switching power supply configured thus according to the prior art will be described below in accordance with the accompanying drawing.

FIG. 10 is a circuit diagram showing the configuration of the switching power supply of the prior art. The circuit configuration of FIG. 10 is made up of a switching element 101, a switching element control circuit block 102, a capacitor 103 for generating the power supply voltage of the switching element control circuit block 102, a converter circuit made up of a diode 104, a coil 105, and an output capacitor 106 for smoothing voltage, an output voltage detecting control circuit block 107, a capacitor 108 for generating the power supply voltage of the output voltage detecting control circuit block 107, and resistors 109 and 110 for detecting an output voltage.

When a DRAIN terminal of the switching element 101 is fed with a voltage (a voltage obtained by rectifying a commercial AC power with a rectifier such as a diode bridge and smoothing the power through a smoothing capacitor and the like, or a DC voltage) from an input terminal IN, a regulator in the switching element control circuit block 102 supplies a current to the capacitor 103 and the power supply voltage is generated for the operation of the switching element control circuit block 102. After that, when the voltage generated by the capacitor 103 reaches at least the starting voltage of the switching element control circuit block 102, the switching element control circuit block 102 starts the on-off control of the switching element 101.

When the switching element 101 starts an on/off operation, power is supplied to the converter circuit made up of the diode 104, the coil 105, and the output capacitor 106 and the output voltage of an output terminal OUT increases. The output voltage is divided by the resistors 109 and 110 and a signal V01 of the divided voltage is inputted to the output voltage detecting control circuit block 107. When the output voltage increases, a regulator in the output voltage detecting control circuit block 107 supplies a current to the capacitor 108 and the power supply voltage is generated for the operation of the output voltage detecting control circuit block 107. After that, when the voltage generated by the capacitor 108 reaches at least the starting voltage of the output voltage detecting control circuit block 107, the output voltage detecting control circuit block 107 becomes operable and starts detection control on the output voltage of the output terminal OUT.

After that, when the output voltage of the output terminal OUT is a specified value or higher, the output voltage detecting control circuit block 107 outputs a feedback current signal IFB, which reduces the peak current value of the switching element 101, to the switching element control circuit block 102. The switching element control circuit block 102 controls the on-off of the switching element 101 in response to the feedback current signal IFB, thereby achieving current mode PWM control according to an output load condition. When the output is under light-load conditions, the number of feedback current signals IFB from the output voltage detecting control circuit block 107 to the switching element control circuit block 102 further increases and the switching element control circuit block 102 decides that the output is under light-load conditions and suspends or stops the switching element 101. When the output voltage of the output terminal OUT decreases, the on-off control of the switching element 101 is restarted.

By performing switching control thus according to an output load, power saving can be achieved under light-load conditions.

In the foregoing chopper-type step-down switching power supply, the switching element 101 and the switching element control circuit block 102 are disposed on the high side of an input voltage applied to the input terminal IN and the output voltage detecting control circuit block 107 is disposed on the low side of the input voltage applied to the input terminal IN. In this switching power supply of the prior art, the output voltage detecting control circuit block 107 does not operate unless the output voltage of the output terminal OUT reaches at least a power supply voltage necessary for the output voltage detecting control circuit block 107 at power-on and so on. Thus the feedback current signal IFB cannot be transmitted to the switching element control circuit block 102, so that feedback control cannot be normally performed.

In a period during which feedback control cannot be normally performed, the detected peak current value of the switching element 101 is fixed at the upper limit value which is determined beforehand by the switching element control circuit block 102. Further, there is always a delay time between when the switching element control circuit block 102 detects the peak current value and when the switching element 101 is turned off. In this case, when energy is hardly consumed in the off period of the switching element 101 because of no load on the output terminal OUT, a current passing through the switching element 101 has a continuous waveform at power-on. For example, even when the switching element control circuit block 102 detects the peak current value at the turn-on of the switching element 101, the value of current passing through the switching element 101 gradually increases because of the delay time.

Consequently, the on-duty width of the switching element 101 is kept at the minimum (will be referred to as the minimum pulse width), the control of the peak current value is kept disabled, and the value of current passing through the switching element 101 increases in the period during which feedback control is not normally performed, so that the switching element 101 may be broken.

Further, when the output terminal OUT is overloaded during a steady-state operation and the output voltage decreases, the output voltage detecting control circuit block 107 is not operated, so that the switching element control circuit block 102 cannot normally perform feedback control as has been discussed.

DISCLOSURE OF THE INVENTION

The present invention has been devised to solve the problem of the prior art. An object of the present invention is to provide a switching power supply and a semiconductor device used for the same which can always perform normal feedback control in an initial period having a low output voltage after power-on, at power-on under no-load conditions, and when the output voltage is reduced by an overload during a steady-state operation, and can reliably prevent a switching element from being broken in the event of abnormal feedback control.

In order to solve the problem, a switching power supply of the present invention includes: a switching element connected between an input-side main terminal and a ground potential to turn on/off a first DC voltage; a converter circuit connected between an output-side main terminal of the switching element and the ground potential to convert a current intermittently outputted from the output-side main terminal in response to an on/off operation of the switching element to a second DC voltage smaller in absolute value than the first DC voltage and output the second DC voltage; a first control circuit block connected between the input-side main terminal and the output-side main terminal of the switching element to control the on/off operation of the switching element from the control terminal of the switching element; a first capacitor connected between the first control circuit block and the output-side main terminal of the switching element to generate the power supply voltage of the first control circuit block; an output voltage detection circuit for detecting the second DC voltage; a second control circuit block which is connected between a contact between the first control circuit block and the first capacitor and the ground potential, is fed with the output voltage signal of the output voltage detection circuit, and outputs a feedback signal to the first control circuit block in response to a change of the output voltage signal to allow the first control circuit block to perform feedback control on the on/off operation of the switching element; and a second capacitor connected between the second control circuit block and the ground potential to generate the power supply voltage of the second control circuit block, wherein the first control circuit block and the second control circuit block are connected such that the first control circuit block has a reference potential on a higher voltage side than the reference potential of the second control circuit block, and the first control circuit block starts the on/off operation of the switching element after the power supply voltage of the first control circuit block and the power supply voltage of the second control circuit block both reach starting voltages and the feedback signal is inputted from the second control circuit block.

Further, the first control circuit block includes: a first regulator which has one end connected to the input-side main terminal of the switching element and the other end connected to the first capacitor and generates the power supply voltage of the first control circuit block; a first starting voltage detection circuit for detecting that the power supply voltage of the first control circuit block has reached the starting voltage; an oscillator circuit for outputting a pulse signal for generating a switching signal for turning on/off the switching element; an element current detection circuit for detecting a current passing through the switching element and outputting the current as an element current detection signal; a first feedback terminal fed with the feedback signal from the second control circuit block; a first feedback signal control circuit for outputting a signal for controlling the amount of current and the output state of the switching signal in response to the feedback signal; a clamping circuit for outputting a signal for fixing the maximum value of the element current detection signal from the element current detection circuit; a comparator for performing an amplitude comparison between the element current detection signal from the element current detection circuit and a lower one of the values of the output signal from the first feedback signal control circuit and the output signal from the clamping circuit, and outputting a comparison signal according to the comparison result;

and a switching signal control circuit for controlling the amount of current and the output state of the switching signal based on the comparison signal from the comparator, the second control circuit block includes: a second regulator which has one end connected to a contact between the first regulator and the first capacitor and the other end connected to the second capacitor and generates the power supply voltage of the second control circuit block; a second starting voltage detection circuit for detecting that the power supply voltage of the second control circuit block has reached the starting voltage; a second feedback signal control circuit for comparing the output signal of the output voltage detection circuit and a predetermined reference voltage and outputting the feedback signal; and a second feedback terminal for outputting the feedback signal from the second feedback signal control circuit, wherein the second control circuit block transmits the feedback signal to the first feedback terminal through the second feedback terminal, and the first control circuit block starts an operation after the output signal of the first starting voltage detection circuit and the feedback signal are both inputted.

A switching power supply of the present invention includes: a switching element connected between an input-side main terminal and a ground potential to turn on/off a first DC voltage; a converter circuit connected between an output-side main terminal of the switching element and the ground potential to convert a current intermittently outputted from the output-side main terminal in response to an on/off operation of the switching element to a second DC voltage smaller in absolute value than the first DC voltage and output the second DC voltage; a first control circuit block connected between the input-side main terminal and the output-side main terminal of the switching element to control the on/off operation of the switching element from the control terminal of the switching element; a first capacitor connected between the first control circuit block and the output-side main terminal of the switching element to generate the power supply voltage of the first control circuit block; an output voltage detection circuit for detecting the second DC voltage; a second control circuit block which is connected among the input-side main terminal of the switching element, the second DC voltage, and the ground potential, is fed with the output voltage signal of the output voltage detection circuit, and outputs a feedback signal to the first control circuit block in response to a change of the output voltage signal to allow the first control circuit block to perform feedback control on the on/off operation of the switching element; and a second capacitor connected between the second control circuit block and the ground potential to generate the power supply voltage of the second control circuit block, wherein the first control circuit block and the second control circuit block are connected such that the first control circuit block has a reference potential on a higher voltage side than the reference potential of the second control circuit block, and the first control circuit block starts the on/off operation of the switching element after the power supply voltage of the first control circuit block and the power supply voltage of the second control circuit block both reach starting voltages and the feedback signal is inputted from the second control circuit block.

According to the switching power supply configured thus, the first control circuit block for controlling the on/off operation of the switching element can start the operation after the start of an operation of the second control circuit block for outputting the feedback signal in response to a change of the output voltage detection signal.

Moreover, the first control circuit block includes: a first regulator which has one end connected to the input-side main terminal of the switching element and the other end connected to the first capacitor and generates the power supply voltage of the first control circuit block; a first starting voltage detection circuit for detecting that the power supply voltage of the first control circuit block has reached the starting voltage; an oscillator circuit for outputting a pulse signal for generating a switching signal for turning on/off the switching element; an element current detection circuit for detecting a current passing through the switching element and outputting the current as an element current detection signal; a first feedback terminal fed with the feedback signal from the second control circuit block; a first feedback signal control circuit for outputting a signal for controlling the amount of current and the output state of the switching signal in response to the feedback signal; a clamping circuit for outputting a signal for fixing the maximum value of the element current detection signal from the element current detection circuit; a comparator for performing an amplitude comparison between the element current detection signal from the element current detection circuit and a lower one of the values of the output signal from the first feedback signal control circuit and the output signal from the clamping circuit, and outputting a comparison signal according to the comparison result; and a switching signal control circuit for controlling the amount of current and the output state of the switching signal based on the comparison signal from the comparator, the second control circuit block includes: a second regulator which generates the power supply voltage of the second control circuit block from the first DC voltage of the input-side main terminal of the switching element connected to a first input end and the second DC voltage of the converter circuit connected to a second input end, and supplies the power supply voltage to the second capacitor; a second starting voltage detection circuit for detecting that the power supply voltage of the second control circuit block has reached the starting voltage; a second feedback signal control circuit for comparing the output signal of the output voltage detection circuit and a predetermined reference voltage and outputting the feedback signal; and a second feedback terminal for outputting the feedback signal from the second feedback signal control circuit, wherein the starting voltage of the second control circuit block from the second regulator is lower than the starting voltage of the first control circuit block from the first regulator, the second control circuit block first starts an operation at power-on, the second control circuit block transmits the feedback signal to the first feedback terminal through the second feedback terminal, and the first control circuit block starts an operation after the output signal of the first starting voltage detection circuit and the feedback signal are both inputted.

Further, the second regulator includes: a starting constant current source connected to an input terminal fed with the first DC voltage; a switch for determining the supply of an output from the starting constant current source to the second capacitor; and a switch connected to an input terminal fed with the second DC voltage, and determining the supply of the second DC voltage to the second capacitor, wherein power is supplied from the first DC voltage to the second capacitor when the second DC voltage is lower than a constant value, and the supply from the first DC voltage is shut down to supply power from the second DC voltage to the second capacitor when the second DC voltage is higher than the constant value.

According to the switching power supply configured thus, the first control circuit block for controlling the on/off operation of the switching element can start the operation after the start of an operation of the second control circuit block for outputting the feedback signal in response to a change of the output voltage detection signal. When an output voltage is higher than the constant value, power can be supplied to the second control circuit block from the output voltage instead of an input voltage, thereby achieving a switching power supply with high power conversion efficiency.

Moreover, the first regulator includes at least a starting constant current source and a switch for determining power supply to the first capacitor, the second regulator includes at least a switch for determining power supply to the second capacitor, the first control circuit block includes a light-load oscillation control circuit for stopping the on/off operation of the switching element when the output voltage of the first feedback signal control circuit is lower than the internally specified lower limit voltage value of a light-load reference voltage source, and restarting the on/off operation of the switching element when the output voltage is higher than the upper limit voltage of the light-load reference voltage source, the first feedback signal control circuit includes a device for fixing, before startup prior to the transmission of the feedback signal from the second control circuit block, the potential of the first feedback terminal at a preset voltage determined based on the reference potential of the first control circuit block, the fixation is released when the first control circuit block becomes operable, and the on/off operation of the switching element is started from a state in which the output signal from the first feedback signal control circuit decreases to the same voltage as the light-load reference voltage source.

The switching power supply configured thus includes intermittent operation control at a light load, thereby reducing power consumption at a light load. Further, the fixation is released when the first control circuit block becomes operable, and the switching operation is started from the state in which the output signal from the feedback signal control circuit decreases to the same voltage as the light-load reference voltage source, thereby achieving an operation for gradually increasing the peak current value of the switching element from a small value, that is, soft start control at the start of the switching.

Further, the second control circuit block includes an error amplifier for comparing the output signal of the output voltage detection circuit and the predetermined reference voltage and amplifying the potential difference, converts the output voltage of the error amplifier to a current, and outputs the current as the feedback signal, the first feedback signal control circuit charges a third capacitor, which is connected between the first feedback terminal and the output-side main terminal of the switching element, by a voltage corresponding to the drawing current value of the feedback signal, and includes a constant current source for charging the third capacitor when the feedback signal is not supplied, and an oscillatory frequency of the oscillator circuit for turning on/off the switching element is reduced or an oscillation is stopped when the voltage of the first feedback terminal is increased and the signal of the first feedback terminal reaches at least a predetermined voltage.

According to the switching power supply configured thus, when the first feedback terminal voltage is increased and the feedback terminal signal reaches at least the predetermined voltage, the oscillatory frequency of the switching element can be reduced or the oscillation can be stopped.

Moreover, the second control circuit block includes an overload protection circuit for detecting a load condition as an overloaded state and outputting an overload protection signal when the output signal of the output voltage detection circuit has a voltage lower than a second reference voltage which is lower than the lower limit value of the reference voltage of the second feedback signal control circuit, and the second control circuit block outputs the feedback signal for reducing the oscillatory frequency of the oscillator circuit for turning on/off the switching element or stopping the oscillation in a period during which the overload protection signal is outputted from the overload protection circuit.

According to the switching power supply configured thus, even when the output voltage decreases in an overloaded state and the like, the second control circuit block is operable. The first control circuit block can perform an overload protection operation in response to the feedback signal from the second control circuit block.

A semiconductor device of the present invention in which the switching power supply has a partially integrated functional part, wherein in the first control circuit block, the input-side main terminal of the switching element and one end of the first regulator of the first control circuit block are connected in common, the output-side main terminal of the switching element and the reference potential terminal of the first control circuit block are connected in common, at least four terminals are integrated as external connection terminals on the same first semiconductor substrate, the terminals including the input-side main terminal of the switching element, the output-side main terminal of the switching element, a terminal for connecting the first capacitor, and a terminal for connecting the first feedback terminal, and in the second control circuit block, at least five terminals are integrated as external connection terminals on the same second semiconductor substrate, the terminals including an input terminal to which one end of the second regulator is connected, a terminal to which the other end of the second regulator and the second capacitor are connected, a terminal fed with the output signal from the output voltage detection circuit, a terminal for connecting the second feedback terminal, and a terminal connected to the ground potential, the terminal for connecting the first capacitor and the input terminal of the second control circuit block are connected in common, and the first feedback terminal and the second feedback terminal are connected in common and are mounted in a package having at least seven terminals.

According to the semiconductor device configured thus, the switching element, the control circuit of the switching element, and the output voltage detection control circuit can be mounted in a single package, thereby considerably reducing the number of components. Further, the feedback control signal is transmitted in the package, so that the signal is hardly affected by noise and the like from the outside and feedback control is not disabled by damage and the like of the components. It is therefore possible to achieve a highly safe semiconductor device.

Further, the first regulator includes at least a starting constant current source and a switch for determining power supply to the first capacitor, the first control circuit block includes a light-load oscillation control circuit for stopping the on/off operation of the switching element when the output voltage of the first feedback signal control circuit is lower than the internally specified lower limit voltage value of a light-load reference voltage source, and restarting the on/off operation of the switching element when the output voltage is higher than the upper limit voltage of the light-load reference voltage source, the first feedback signal control circuit includes a device for fixing, before startup prior to the transmission of the feedback signal from the second control circuit block, the potential of the first feedback terminal at a preset voltage determined based on the reference potential of the first control circuit block, the fixation is released when the first control circuit block becomes operable, and the on/off operation of the switching element is started from a state in which the output signal from the first feedback signal control circuit decreases to the same voltage as the light-load reference voltage source.

The switching power supply configured thus includes intermittent operation control at a light load, thereby reducing power consumption at a light load. Further, the fixation is released when the first control circuit block becomes operable, and the switching operation is started from the state in which the output signal from the feedback signal control circuit decreases to the same voltage as the light-load reference voltage source, thereby achieving an operation for gradually increasing the peak current value of the switching element from a small value, that is, soft start control at the start of the switching.

Further, the second control circuit block includes an error amplifier for comparing the output signal of the output voltage detection circuit and the predetermined reference voltage and amplifying the potential difference, converts the output voltage of the error amplifier to a current, and outputs the current as the feedback signal, the first feedback signal control circuit charges the third capacitor, which is connected between the first feedback terminal and the output-side main terminal of the switching element, by a voltage corresponding to the drawing current value of the feedback signal, and includes a constant current source for charging the third capacitor when the feedback signal is not supplied, and an oscillatory frequency of the oscillator circuit for turning on/off the switching element is reduced or an oscillation is stopped when the voltage of the first feedback terminal is increased and the signal of the first feedback terminal reaches at least a predetermined voltage.

According to the switching power supply configured thus, when the first feedback terminal voltage is increased and the feedback terminal signal reaches at least the predetermined voltage, the oscillatory frequency of the switching element can be reduced or the oscillation can be stopped.

Moreover, the second control circuit block includes an overload protection circuit for shutting down supply from the second DC voltage, supplying power from the first DC voltage to the second capacitor, detecting a load condition as an overloaded state, and outputting an overload protection signal when the second DC voltage is lower than the constant value during a normal operation, and the second control circuit block outputs the feedback signal for reducing an oscillatory frequency of the oscillator circuit for turning on/off the switching element or stopping an oscillation in a period during which the overload protection signal is outputted from the overload protection circuit.

According to the switching power supply configured thus, even when the output voltage decreases in an overloaded state and the like, the second control circuit block is operable. The first control circuit block can perform an overload protection operation in response to the feedback signal from the second control circuit block.

Further, the second regulator includes a junction FET which is connected to an input terminal fed with the first DC voltage; a switch for determining the supply of an output from the junction FET to the second capacitor; a switch which is connected to an input/output terminal to and from which the second DC voltage is inputted and outputted and determines the supply of the second DC voltage to the second capacitor; and a switch for determining the connection of the output of the junction FET to the input/output terminal to and from which the second DC voltage is inputted and outputted, when the second DC voltage is lower than the constant value, power is supplied from the first DC voltage to the second capacitor and the second DC voltage is supplied through the input/ output terminal, the feedback signal for transmitting the stop of the on/off operation of the switching element is outputted to the first control circuit block, when the second DC voltage is higher than a predetermined first voltage, the feedback signal for transmitting the start of the on/off operation of the switching element is outputted to the first control circuit block, and when the second DC voltage is higher than a predetermined second voltage, the supply from the first DC voltage is shut down and power is supplied from the second DC voltage to the second capacitor.

According to the switching power supply configured thus, a high voltage applied to the high potential side of the junction field-effect transistor (FET) is pinched off at a low voltage on the low potential side of the junction FET by the pinch-off effect of the junction FET.

Further, with this configuration, power can be supplied from the first DC voltage to the first and second control circuit blocks, thereby reducing a power loss caused by a starting resistance and the like. It is therefore possible to achieve a switching power supply with high power conversion efficiency. Further, at power-on or during overload protection, power can be supplied from the output terminal of the junction FET to the input/output terminal, to and from which the second DC voltage is inputted and outputted, while the switching element is kept turned off, and it is possible to prevent an overcurrent from passing through the switching element at power-on or during overload protection. Moreover, a period for protecting the switching element from an overcurrent (that is, a soft start period) does not depend on the settings of external components, signals from the outside, an internally generated time, and so on.

Moreover, the second control circuit block includes an input voltage detection circuit for comparing the first DC voltage and the predetermined reference voltage; a first feedback circuit for outputting the output signal of the input voltage detection circuit as a first feedback signal to the first control circuit block; a load detection circuit for comparing the output signal of the output voltage detection circuit and the predetermined reference voltage; an error amplifier for comparing the output signal of the output voltage detection circuit and the predetermined reference voltage and amplifying the potential difference; and a second feedback signal control circuit for converting the output signal of the load detection circuit and the output voltage of the error amplifier to currents and outputting a second feedback signal, the first control circuit block includes an input detection circuit which is fed with the signal from the first feedback circuit and outputs the signal to the oscillator circuit, when the second control circuit block reaches the starting voltage, the first feedback circuit detects the state of the first DC voltage and the second feedback signal control circuit detects the state of the second DC voltage, when the first DC voltage and the second DC voltage are lower than the reference voltages, the oscillatory frequency of the oscillator circuit corresponding to the on/off operation of the switching element is increased and the feedback signal is outputted with the element current detection circuit set at the value of the output signal from the clamping circuit, as the first DC voltage and the second DC voltage increase, the feedback signal is outputted to gradually reduce the oscillatory frequency corresponding to the on/off operation of the switching element and the output signal of the element current detection circuit, when the first DC voltage reaches the predetermined reference voltage, the oscillatory frequency corresponding to the on/off operation of the switching element is fixed, and when the second DC voltage reaches the predetermined reference voltage, the second feedback signal control circuit outputs the feedback signal for controlling the peak current value of the switching element such that the second DC voltage is kept at a desired voltage thereafter.

According to the switching power supply configured thus, the second control circuit block includes the input voltage detection circuit and thus it is possible to detect the states of input voltage and output voltage. The output voltage can be quickly raised by high-frequency driving in a period during which an input/output voltage difference is small.

In a chopper-type step-down switching power supply, the on-duty ratio of the switching element is determined by an input/output voltage ratio. Thus even when the peak current value is set high relative to a small input/output voltage difference, the on-duty ratio of switching increases, so that the control of the peak current value is not disabled unlike in driving with the minimum pulse width.

Moreover, a period for starting the switching power supply while protecting the switching element from an overcurrent (that is, a soft start period) does not depend on the settings of external components, signals from the outside, an internally generated time, and so on.

A semiconductor device of the present invention in which the switching power supply has a partially integrated functional part, wherein in the first control circuit block, the input-side main terminal of the switching element and one end of the first regulator of the first control circuit block are connected in common, the output-side main terminal of the switching element and the reference potential terminal of the first control circuit block are connected in common, at least four terminals are integrated as external connection terminals on the same first semiconductor substrate, the terminals including the input-side main terminal of the switching element, the output-side main terminal of the switching element, a terminal for connecting the first capacitor, and a terminal for connecting the first feedback terminal, and in the second control circuit block, at least six terminals are integrated as external connection terminals on the same second semiconductor substrate, the terminals including an input terminal to which the input-side main terminal of the switching element and one end of the second regulator are connected in common, a terminal to which the other end of the second regulator and the second capacitor are connected, an input/output terminal to and from which the second DC voltage is inputted and outputted, a terminal fed with the output signal of the output voltage detection circuit, a terminal for connecting the second feedback terminal, and a terminal connected to the ground potential, the input-side main terminal of the switching element and the input terminal of the second control circuit block are connected in common, and the first feedback terminal and the second feedback terminal are connected in common and are mounted in a package having at least eight terminals.

According to the semiconductor device configured thus, the switching element, the control circuit of the switching element, and the output voltage detection control circuit can be mounted in a single package, thereby considerably reducing the number of components. Further, the feedback control signal is transmitted in the package, so that the signal is hardly affected by noise and the like from the outside and feedback control is not disabled by damage and the like of the components. It is therefore possible to achieve a highly safe semiconductor device.

Moreover, power can be supplied to the second control circuit block not only from the first DC voltage but also from the second DC voltage. It is therefore possible to achieve a semiconductor device with high power conversion efficiency.

Further, in the first control circuit block, the element current detection circuit is made up of: a second switching element which is controlled to be turned on/off in a similar manner to the switching element, is fed with a current smaller than a current passing through the switching element, and has a constant current ratio relative to the current passing through the switching element; and a resistor connected in series between the other end of the second switching element and the reference potential of the first control circuit block, and a voltage across the resistor is detected as the element current detection signal.

The present invention can prevent the switching element from an overcurrent during overcurrent protection and reduce power consumption during standby while detecting an output voltage immediately after power-on and achieving soft start control without being restricted by time.

It is thus possible to always perform normal feedback control in an initial period having a low output voltage after power-on, at power-on under no-load conditions, and when the output voltage is reduced by an overload during a steady-state operation, reliably prevent the switching element from being broken in the event of abnormal feedback control, and improve power conversion efficiency.

DESCRIPTION OF THE EMBODIMENTS

Figure 1:
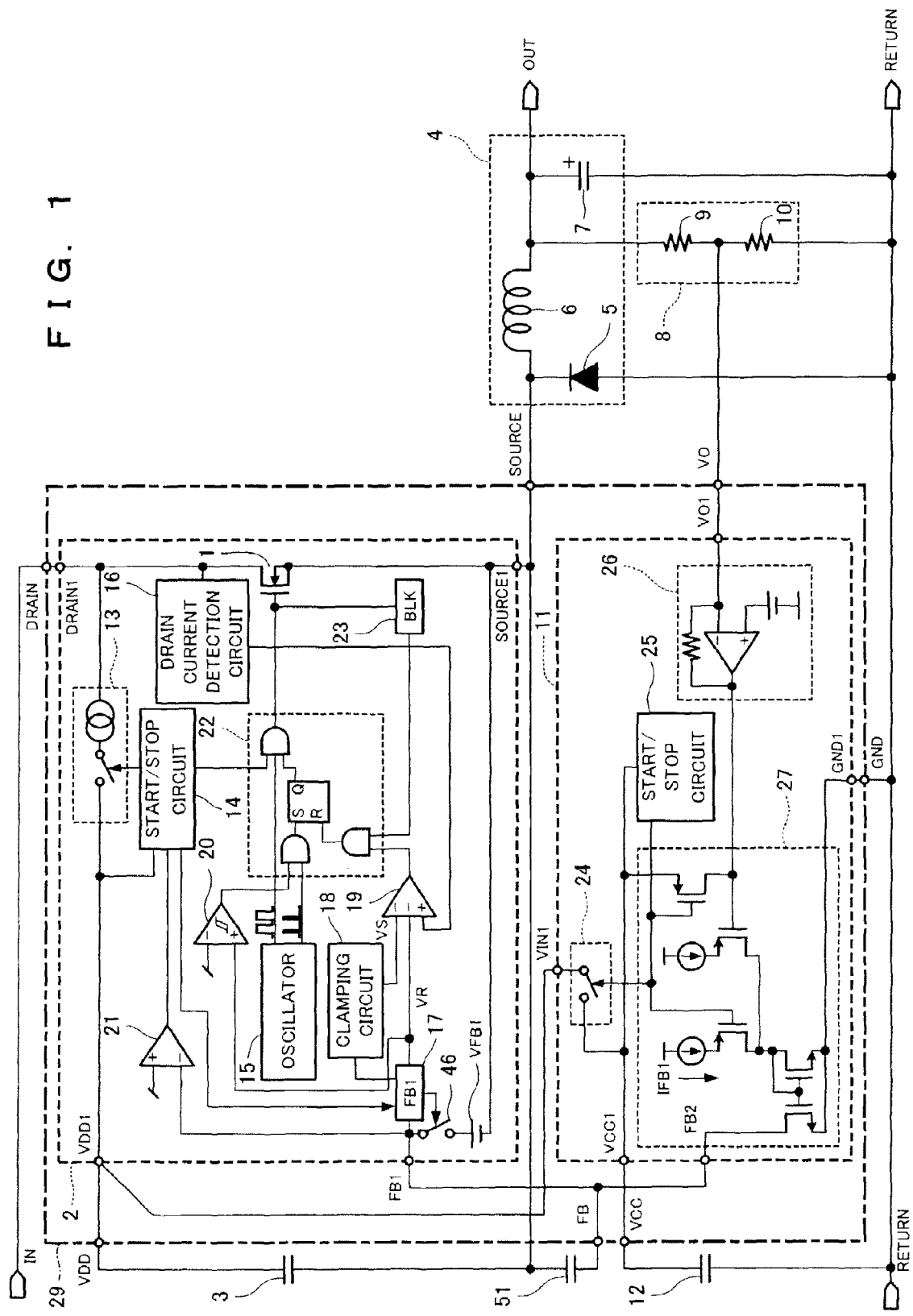
FIG. 1 is a circuit diagram showing a switching power supply and a semiconductor device according to a first embodiment of the present invention.

The following will specifically describe a switching power supply and a semiconductor device used for the same according to embodiments of the present invention, with reference to the accompanying drawings.

In the explanation of the drawings, the same members are indicated by the same reference numerals and a redundant explanation thereof is omitted. In the following embodiments, chopper-type step-down switching power supplies having positive output loads will be illustrated. When an output has a negative second DC voltage, even a set requiring a negative control voltage source can be handled by the switching power supply of the present invention which has the same basic circuit as a positive voltage source.

Moreover, the following embodiments will describe examples of a device for embodying a technical idea of the present invention. In the technical idea of the present invention, the layout or the like of components in each block is not specified by the following embodiments. Further, the technical idea of the present invention can be modified in various ways within the scope of claims.

First Embodiment

The following will describe a switching power supply and a semiconductor device according to a first embodiment of the present invention.

FIG. 1 is a circuit diagram showing the configurations of the switching power supply and the semiconductor device according to the first embodiment. In FIG. 1, a switching element 1 is, for example, a high-breakdown voltage transistor which includes an input-side main terminal, an output-side main terminal, and a control terminal. A first control circuit block 2 is connected to an input terminal, an internal circuit power supply terminal, a feedback signal input terminal, a reference potential terminal, and the control terminal of the switching element 1, and includes an on/off control signal output terminal for the switching element 1.

The switching element 1 and the first control circuit block 2 are integrated on the same substrate. The external connection terminals of the first control circuit block 2 include a DRAIN1 terminal to which the input-side main terminal of the switching element 1 and an input terminal IN of the first control circuit block 2 are connected in common, a SOURCE1 terminal to which the output main terminal of the switching element 1 and a reference potential terminal SOURCE of the first control circuit block 2 are connected in common, a VDD1 terminal for the internal circuit power supply of the first control circuit block 2, and an FB1 terminal for inputting a feedback signal.

A second control circuit block 11 is integrated and has external connection terminals including a VIN1 terminal serving as an input terminal, a VCC1 terminal for an internal circuit power supply, a VO1 terminal fed with a signal from an output voltage detection circuit 8, an FB2 terminal for outputting the feedback signal, and a GND1 terminal for the reference potential of the second control circuit block 11.

The integrated switching element 1, first control circuit block 2, and second control circuit block 11 are mounted into a single semiconductor package (semiconductor device) 29. The external connection terminals at this point are seven terminals: a DRAIN terminal to which the input main terminal of the switching element 1 and the input terminal IN of the first control circuit block 2 are connected in common, a SOURCE terminal to which the output main terminal of the switching element 1 and the reference potential terminal of the first control circuit block 2 are connected in common, a VDD terminal to which the internal circuit power supply terminal of the first control circuit block 2 and the input terminal of the second control circuit block 11 are connected in common, an FB terminal to which the feedback signal input terminal of the first control circuit block 2 and the feedback signal input terminal of the second control circuit block 11 are connected in common, a VCC terminal to which the internal power supply terminal of the second control circuit block 11 is connected, a VO terminal fed with a signal from the output voltage detection circuit 8, and a GND terminal to which the reference potential terminal of the second control circuit block 11 is connected.

Reference numeral 3 denotes a capacitor for generating the power of the first control circuit block 2, reference numeral 12 denotes a capacitor for generating the power of the second control circuit block 11, and reference numeral 51 denotes a capacitor connected between the FB terminal and the SOURCE terminal. A converter circuit 4 is made up of a diode 5, a coil 6, and an output capacitor 7 for smoothing a voltage and supplies an output current from an OUT terminal to a load (not shown) by applying the terminal voltage of the output capacitor 7 to the load as the output voltage of the OUT terminal. The output voltage detection circuit 8 is made up of resistors 9 and 10.

The first control circuit block 2 is made up of a regulator 13 which includes a constant current source and a switch and has one end connected to the DRAIN terminal to supply an internal circuit power supply voltage (VDD terminal voltage), a start/stop circuit 14 which starts the first control circuit block 2 when the VDD terminal voltage is not lower than a specified value, and stops the first control circuit block 2 when the VDD terminal voltage is not higher than a specified voltage, an oscillator 15 for outputting an internal reference clock signal for determining the maximum on duty and the oscillatory frequency of the switching element 1, a drain current detection circuit 16 which detects a current (drain current: IDS) passing through the switching element 1 and converts the current to a voltage, a first feedback signal control circuit 17 for converting a current signal, which is supplied from the FB terminal as the feedback signal from the second control circuit block 11, into a voltage signal and determining the reference value of the peak current passing through the switching element 1, a clamping circuit 18 for determining a reference voltage (VS) corresponding to the maximum value (ILIMIT) of the current (IDS) passing through the switching element 1, a comparator 19 which compares lower one of an output signal VR from the first feedback signal control circuit 17 and an output signal VS from the clamping circuit 18 and an output signal from the drain current detection circuit 16 and outputs a comparison signal according to the comparison result, a light-load oscillation control circuit 20 which suspends or stops the on-off control of the switching element 1 when the output signal VR from the first feedback signal control circuit 17 is lower than a light load detection reference voltage Vp1 having been internally set (at this point, the light load detection reference voltage Vp1 becomes Vp2, Vp1 is set at about 10% of VS, and Vp2 is set at about 15% of VS) and restarts the on-off control of the switching element 1 when the output signal VR is higher than the light load detection reference voltage Vp2 having been internally set, an overload protection circuit 21 which outputs an overload signal (VOLP) to the start/stop circuit 14 to stop the switching operation of the switching element 1 when the FB terminal voltage (VFB) increases to a voltage (VFBOLP) not lower than a constant voltage (VFB2), an on blanking pulse generating circuit 23 which outputs an "L" signal to the AND circuit of a switching signal control circuit 22 for a certain period after an "H" signal is outputted from the switching signal control circuit 22, and outputs an "H" signal to determine an on blanking time after the certain period, and the switching signal control circuit 22 which is fed with signals from the oscillator 15, the comparator 19, the light-load oscillation control circuit 20, and the on blanking pulse generating circuit 23 and outputs a signal for controlling the amount of current passing through the switching element 1 and the output of the switching element 1.

The second control circuit block 11 is made up of a regulator 24 which is fed with a voltage from the VDD terminal to generate an internal circuit power supply voltage (VCC terminal voltage), a start/stop circuit 25 which starts the second control circuit block 11 when the VCC terminal voltage is not lower than the specified value and stops the second control circuit block 11 when the VCC terminal voltage is not higher than the specified voltage, an error amplifier 26 which compares an output signal from the output voltage detection circuit 8 and an internally set reference voltage and amplifies the potential difference, and a second feedback signal control circuit 27 which converts an output voltage signal from the error amplifier 26 into a current signal to generate a feedback current signal.

Figure 2:
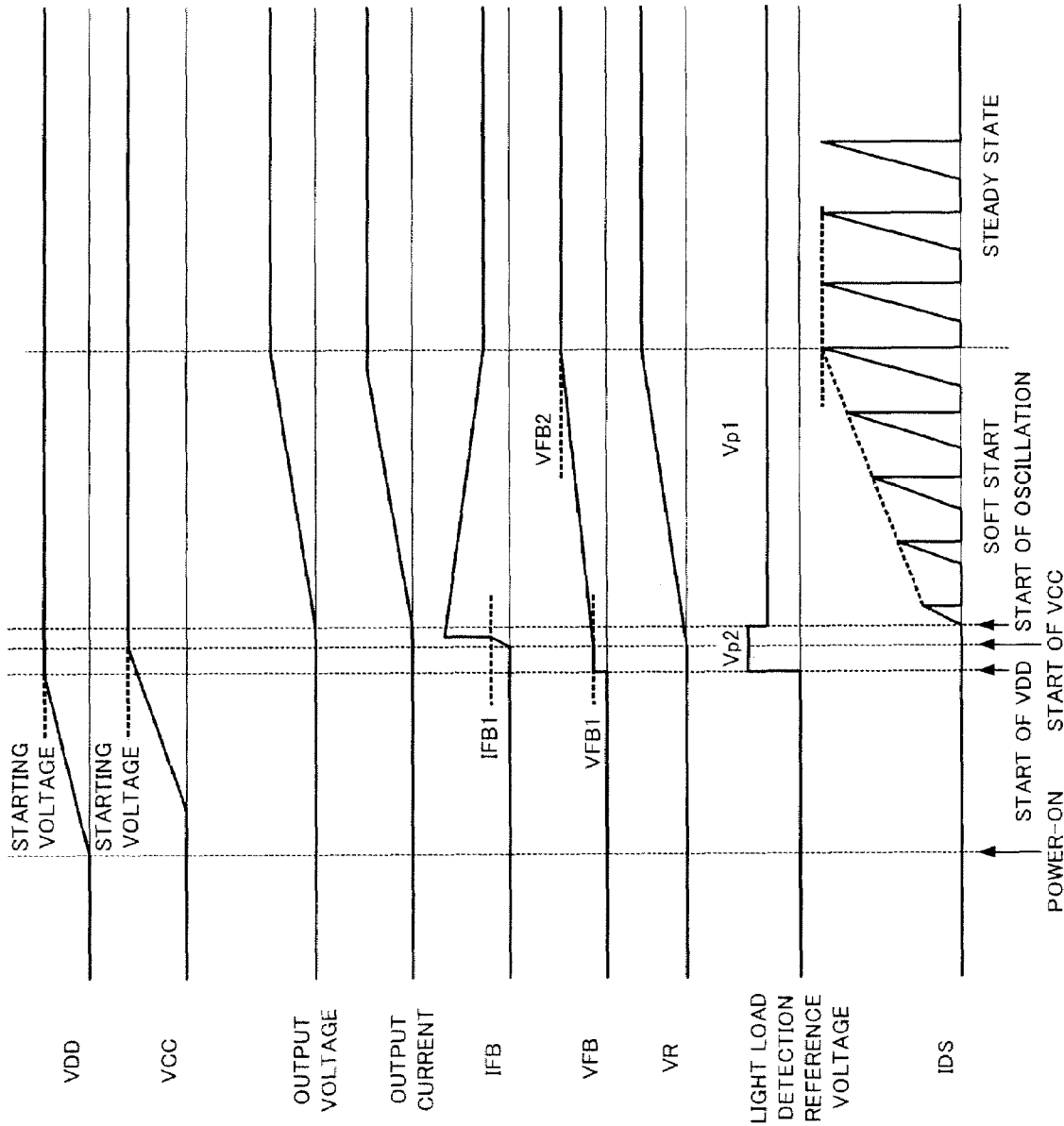
FIG. 2 is a waveform chart showing action (1) in the switching power supply of the first embodiment.
Figure 3:
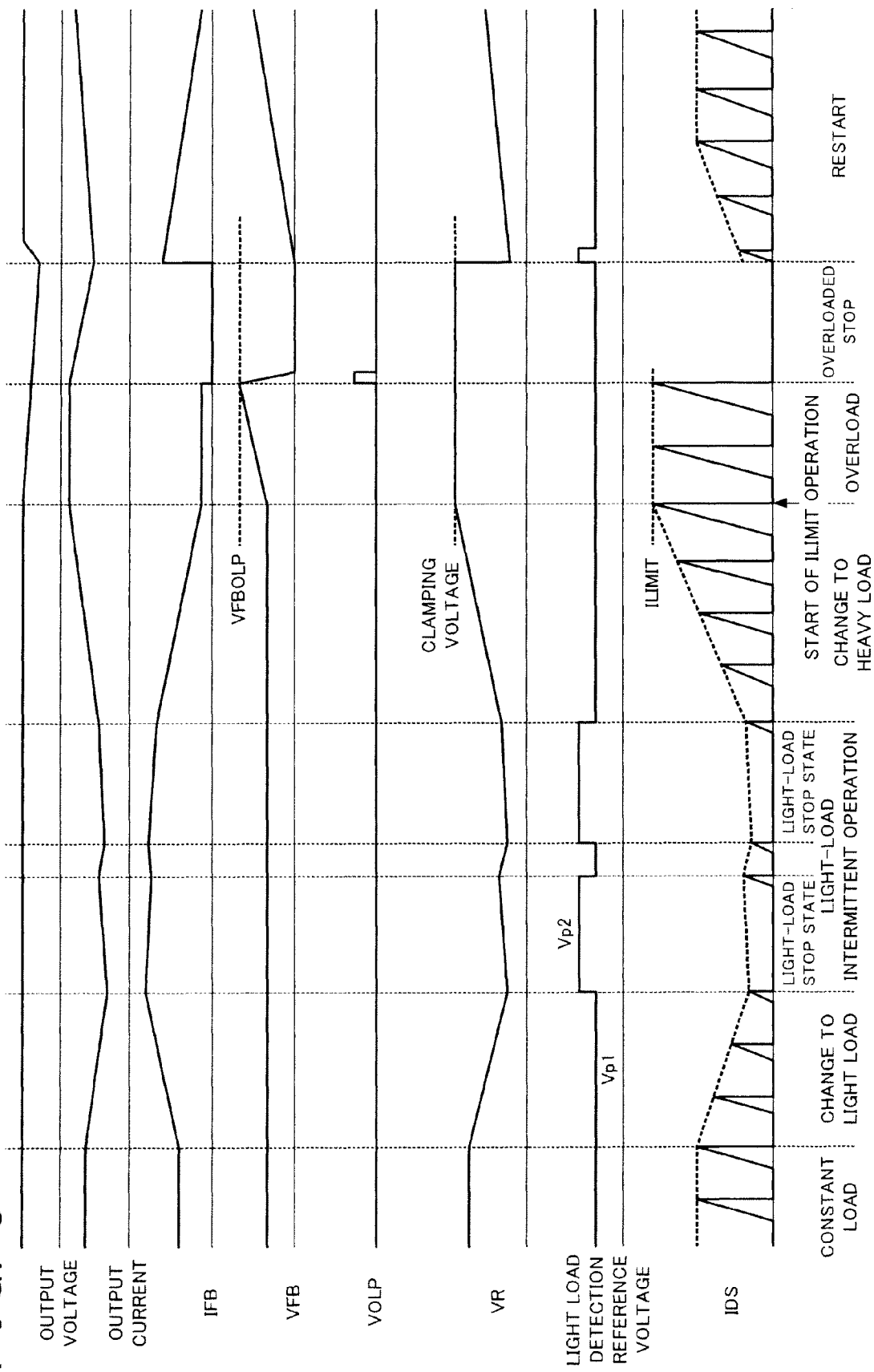
FIG. 3 is a waveform chart showing action (2) in the switching power supply of the first embodiment.

Referring to FIGS. 1, 2, and 3, the following will describe the operations of the switching power supply configured thus.

FIG. 2 is a waveform chart (time chart) showing the states of voltages and currents at power-on in the switching power supply according to the first embodiment. FIG. 3 is a waveform chart (time chart) showing the states of voltages and currents during a light-load intermittent operation from a steady-state operation and during a recovery operation from the light-load intermittent operation, in the switching power supply of the first embodiment.

When an input voltage (not shown, a voltage obtained by rectifying a commercial AC power with a rectifier such as a diode bridge and smoothing the power with an input capacitor, or a DC voltage) is applied from the input terminal IN to the DRAIN terminal connected to the input main terminal of the switching element 1, the regulator 13 of the first control circuit block 2 supplies a current to the capacitor 3 connected to the VDD terminal, so that the VDD terminal voltage increases.

The switch of the regulator 13 is turned on to supply a starting current to the VDD terminal until the VDD terminal voltage reaches the constant voltage. When the VDD terminal voltage reaches a constant potential after that, the switch is turned off to stop the supply of current to the VDD terminal, so that the VDD terminal voltage is kept at the constant potential.

The VDD terminal voltage is also supplied to the second control circuit block 11 as a VIN1 terminal voltage, and a current is also supplied by the regulator 24 of the second control circuit block 11 to the capacitor 12 connected to the VCC terminal, so that the VCC terminal voltage increases.

When the VDD terminal voltage reaches the starting voltage, the start/stop circuit 14 outputs a starting signal. When the VDD terminal voltage reaches the starting voltage, the first feedback signal control circuit 17 of the first control circuit block 2 controls a switch 46 to fix the FB terminal voltage (VFB) at VFB1 lower than the stabilized voltage VFB2 in a normal operation.

When the VCC terminal voltage reaches the starting voltage, the start/stop circuit 25 outputs a starting signal. When the second control circuit block 11 starts an operation in response to the starting signal from the start/stop circuit 25, the error amplifier 26 starts detecting the voltage of the VO terminal. The second feedback signal control circuit 27 also starts an operation to supply a predetermined dummy current IFB1 for informing the first control circuit block that the second control circuit block 11 has started the operation, as a current IFB supplied from the FB1 terminal to the FB2 terminal.

When the second feedback signal control circuit 27 supplies the dummy current IFB1 after the second control circuit block 11 is started, the first feedback signal control circuit 17 detects that the dummy current IFB1 has been supplied through the FB1 terminal and outputs a signal enabling the start of the on/off operation of the switching element 1. At the same time, the first feedback signal control circuit 17 starts the operation of the constant current source for charging the capacitor 51 and releases the fixation of the FB terminal voltage having been fixed at the VFB1 voltage by the switch 46.

When the first control circuit block 2 becomes operable, the first feedback signal control circuit 17 starts supplying a constant current for charging the capacitor 51 from the FB terminal, so that the FB terminal voltage starts increasing. In this case, IFE rapidly rises because of a large voltage difference between VFB1 and VFB2 and then gradually decreases. In other words, the output signal VR of the first feedback signal control circuit 17 gradually increases from a voltage lower than the light load detection reference voltage Vp1.

After that, when the output signal VR of the first feedback signal control circuit 17 increases to the light load detection upper limit voltage Vp2 or higher, the switching element 1 starts the switching operation. At the start of the switching operation, the peak value of the drain current IDS is about 15% of the overcurrent protection level ILIMIT. After that, IFB decreases as the FB terminal voltage increases, and the peak value of IDS increases as VR increases. The FB terminal voltage is then clamped by the stable operation voltage VFB2. In this way, a soft start operation is performed at the start of the switching operation.

Even when the first control circuit block 2 for the on-off control of the switching element 1 reaches the starting voltage first, the on/off operation of the switching element 1 is started after the second control circuit block 11 for controlling output voltage detection reaches the starting voltage, so that the switching operation is not performed in a state in which feedback control is disabled.

Further, the soft start operation can prevent an overshoot which is caused by a rapid increase in output voltage on the OUT terminal at startup. It is also possible to prevent a rapid increase in drain current, thereby reducing the stresses of the components.

When the on-off control of the switching element 1 is started, power is supplied to the converter circuit 4 made up of the diode 5, the coil 6, and the output capacitor 7, so that the output voltage of the output terminal OUT increases. When the output voltage reaches at least a desired voltage (to be precise, when the VO terminal voltage is not lower than the reference voltage value of the error amplifier 26), a difference between the reference voltage of the error amplifier 26 and the VO terminal voltage is amplified and a signal is transmitted to the second feedback signal control circuit 27.

In a state in which the output voltage of the OUT terminal is not lower than the desired voltage, when a load decreases and the output voltage increases, the output voltage signal of the error amplifier 26 linearly decreases, the second feedback signal control circuit 27 outputs a signal for increasing the FB terminal current, and the first feedback signal control circuit 17 reduces the output voltage signal VR. The output voltage signal VR is set at the reference voltage of the comparator 19. As the output voltage signal VR decreases, the peak value of the DRAIN current passing through the switching element 1 decreases, so that PWM control is performed according to a current mode.

The following will describe a light-load intermittent operation from a steady-state operation and a recovery operation from the light-load intermittent operation.

When the output voltage of the OUT terminal reaches at least the desired voltage (the output load is light) and the output voltage signal VR is not higher than the light load detection lower limit voltage of the light-load oscillation control circuit 20, that is, the specified value Vp1, it is determined that the output load is light and the light-load oscillation control circuit 20 suspends or stops the on-off control of the switching element 1. When the on-off control of the switching element 1 is stopped, power supply to the output is stopped and thus the output voltage of the OUT terminal gradually decreases. The output voltage signal VR gradually increases with the decrease in the voltage of the OUT terminal. When the output voltage signal VR reaches at least the light load detection upper limit voltage of the light-load oscillation control circuit 20, that is, the specified value Vp2, the on-off control of the switching element 1 is restarted and power is supplied to the output. Thus the OUT terminal voltage increases again and the on-off control of the switching element 1 is stopped. Under light-load conditions, intermittent control is performed so as to repeat these operations.

The foregoing operations are repeated as long as light-load and no-load conditions continue. The switching operation of the switching element 1 is intermittently performed so as to alternately repeat a switching period and a switching stop period. It is therefore possible to considerably reduce power consumption under light-load and no-load conditions.

The value of a light-load reference voltage source is set such that in the light-load intermittent operation, the peak value of drain current in transition from a switching operation to a light-load stop state is set at about lot of the overcurrent protection level ILIMIT determined by the clamping circuit 18 and the peak value of drain current in transition from the light-load stop state to an operating state is set at about 15% of ILIMIT. In the intermittent operation, drain current having an extremely high peak value causes coil sounds and drain current having an extremely low peak value increases power consumption. Thus, the intermittent operation is properly performed with the foregoing values.

The following will describe an operation after transition from a steady state to an overloaded state.

When the output is overloaded, the OUT terminal voltage decreases and the output voltage detection circuit 8 reduces the VO terminal voltage. As a result, the feedback current signal from the second feedback signal control circuit 11 decreases and feedback current signal components finally disappear, so that only the dummy current IFB1 is left. Since the current value of the constant current source of the first feedback control circuit 2 is sufficiently larger than the dummy current IFB1, a current flowing from the FB terminal charges the capacitor 51.

When the overloaded state continues, the current continues charging the capacitor 51 and the FB terminal voltage VFB continues rising. The feedback terminal voltage VFB is detected by the overload protection circuit 21. When the feedback terminal voltage VFB reaches the voltage VFBOLP (higher than the FB terminal voltage VFB2 in a steady state) at the start of the transition to an overload stop state, a signal VOLP for stopping the switching operation is outputted from the overload protection circuit 21 to the start/stop circuit 14. The signal for stopping the switching operation is outputted thus.

In the operation of the overloaded state, there is a time difference from when the FB terminal voltage starts increasing to when the FB terminal voltage reaches the overload detection voltage VFBOLP, between when the drain current passing through the switching element 1 reaches the overcurrent protection level ILIMIT and when the switching element is stopped in the overloaded state.

Thus even when the load peaks for a certain period, the switching operation is not immediately stopped in overload protection.

In FIGS. 1 and 3, the switching operation is stopped for overload protection. When the FB terminal voltage VFB reaches the voltage VFBOLP (higher than the FB terminal voltage VFB2 in a steady state) at the start of the transition to the overload stop state, a signal VOLP' (not shown) for reducing a switching frequency may be outputted from the overload protection circuit 21 to the oscillator 15 to reduce the number of oscillations of the switching element.

When the signal VOLP for stopping the switching operation is outputted from the overload protection circuit 21 to the start/stop circuit 14, the start/stop circuit 14 transmits, to the first feedback signal control circuit 17, a signal for forcibly discharging the FB terminal and fixing the FB terminal at the VFB1 voltage, so that the feedback terminal voltage rapidly decreases. Thus a recovery operation from an overload protection state performs soft start as in normal start, achieving a safe recovery.

Even immediately after power-on or when the output is overloaded, the power supply voltage of the second control circuit block 11 is stabilized and an output voltage detection control function is not disabled.

Further, the switching element 1 and the first control circuit block 2 are integrated on the same substrate, the second control circuit block 11 is also integrated, and the blocks are mounted in the single semiconductor package 29, thereby considerably reducing the number of components. Moreover, the feedback control signal is transmitted in the semiconductor package, so that the signal is hardly affected by noise and the like from the outside and feedback control is not disabled by damage and the like of the components. It is therefore possible to achieve a highly safe semiconductor device.

Second Embodiment

The following will describe a switching power supply and a semiconductor device according to a second embodiment of the present invention.

Figure 4:
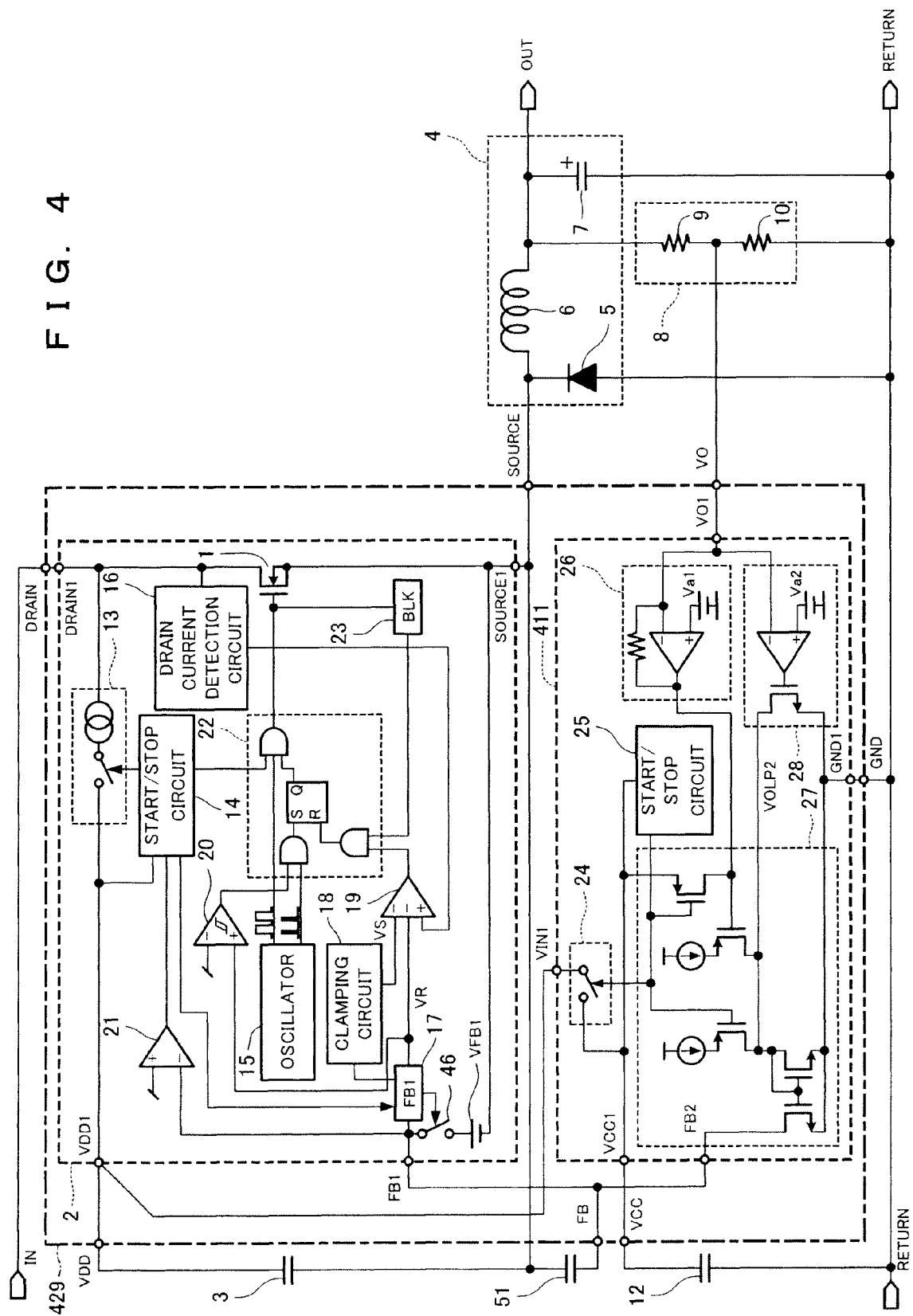
FIG. 4 is a circuit diagram showing a switching power supply and a semiconductor device according to a second embodiment of the present invention.

FIG. 4 is a circuit diagram showing the configurations of the switching power supply and the semiconductor device according to the second embodiment. In FIG. 4, the same constituent elements as FIG. 1 are indicated by the same reference numerals as FIG. 1 and the explanation thereof is omitted.

As shown in FIG. 4, the second embodiment is different from the first embodiment in that an overload protection circuit 28 for detecting an overload is provided in a second control circuit block 411 included in a single semiconductor package (semiconductor device) 429. In the switching power supply of the second embodiment, a starting operation, a steady-state operation, and an operation for reducing standby power consumption under light-load conditions are similar to the operations of the switching power supply of the first embodiment and a detection method for overload protection is different.

The overload protection circuit 28 in the second control circuit block 411 shown in FIG. 4 compares a reference voltage Va2 lower than a reference voltage Va1 of an error amplifier 26 and a VO terminal voltage. When the VO terminal voltage is lower than the reference voltage Va2, the overload protection circuit 28 outputs an overload protection signal VOLP2 to a second feedback signal control circuit 27. When receiving the overload protection signal VOLP2, the second feedback signal control circuit 27 stops the output of a feedback current signal to a first feedback signal control circuit 17.

Consequently, current drawn from a second feedback signal control circuit 11 is eliminated, so that a current flowing from a second FB terminal charges a capacitor 51. When an overloaded state continues, the current continues charging the capacitor 51 and an FB terminal voltage VFB continues rising. The feedback terminal voltage VFB is detected by an overload protection circuit 21. When the FB terminal voltage VFB reaches a voltage VFBOLP (higher than a FB terminal voltage VFB2 in a steady state) at the start of the transition to an overload stop state, a signal VOLP for stopping a switching operation is outputted from the overload protection circuit 21 to a start/stop circuit 14. The signal for stopping the switching operation is outputted thus. When the FB terminal voltage VFB reaches the voltage VFBOLP (higher than the FB terminal voltage VFB2 in a steady state) at the start of the transition to the overload stop state, a signal VOLP1 (not shown) for reducing a switching frequency may be outputted from the overload protection circuit 21 to an oscillator 15 to reduce the number of oscillations of a switching element.

When the overload protection circuit 28 detects an overloaded state and outputs the overload protection signal VOLP2 and the second feedback signal control circuit 27 receives the overload protection signal VOLP2, a signal for stopping the on-off control of a switching element 1 may be transmitted from the second feedback signal control circuit 27 to the start/stop circuit 14 of a first control circuit block 2 through an OLP terminal (not shown) provided only for the signal between the first control circuit block 2 and the second control circuit block 411.

When the second feedback signal control circuit 27 receives the overload protection signal VOLP2, a signal for reducing the switching frequency may be transmitted from the second feedback signal control circuit 27 to the oscillator circuit 15 of the first control circuit block 2 through an OLP terminal (not shown) provided only for the signal between the first control circuit block 2 and the second control circuit block 411. In this case, the signals are transmitted between the OLP terminals in the single semiconductor package (semiconductor device) 429, so that the signals are not affected by noise signals from the outside.

As has been discussed, the overload protection circuit 28 is provided in the second control circuit block 411 for detecting the state of an output voltage and controlling the first control circuit block 2, achieving an overload protection function with higher precision.

Third Embodiment

The following will describe a switching power supply and a semiconductor device according to a third embodiment of the present invention.

Figure 5:
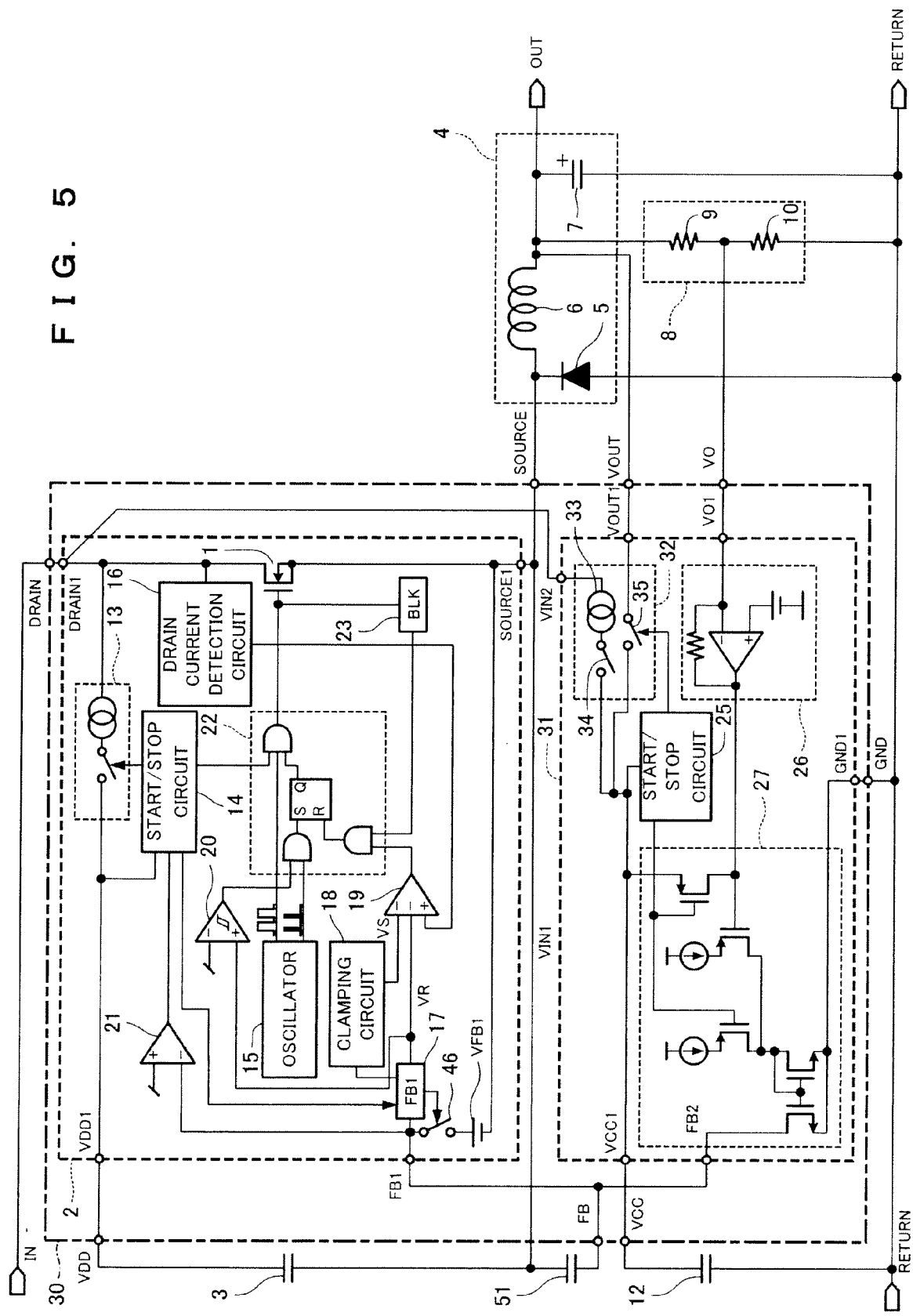
FIG. 5 is a circuit diagram showing a switching power supply and a semiconductor device according to a third embodiment of the present invention.

FIG. 5 is a circuit diagram showing the configurations of the switching power supply and the semiconductor device according to the third embodiment. As shown in FIG. 5, the third embodiment is different from the first embodiment in that a semiconductor package (semiconductor device) 30 in which a switching element 1, a first control circuit block 2, and a second control circuit block 31 are mounted further includes a VOUT terminal connected to an output terminal (OUT terminal) to a load, and the third embodiment is also different in a method of supplying power to the second control circuit block 31.

In the semiconductor package 30 of FIG. 5, the second control circuit block 31 has a VIN2 terminal as an input terminal. The VIN2 terminal is connected as a DRAIN terminal to the common connection terminal of the input terminal of the first control circuit block 2 and the input main terminal of the switching element 1. Further, the second control circuit block 31 includes an input/output terminal VOUT1 connected to the output terminal (OUT terminal) to the load.

The integrated switching element 1, first control circuit block 2, and second control circuit block 31 are mounted in the single semiconductor package 30. The external connection terminals at this point are eight terminals: the DRAIN terminal to which the input main terminal of the switching element, the input terminal of the first control circuit block 2, and the input terminal of the second control circuit block 31 are connected, a SOURCE terminal to which the output main terminal of the switching element 1 and the reference potential terminal of the first control circuit block 2 are connected, a VDD terminal to which the internal circuit power supply terminal of the first control circuit block 2 is connected, an FB terminal to which the feedback signal input terminal of the first control circuit block 2 and the feedback signal input terminal of the second control circuit block 31 are connected in common, a VCC terminal which is the internal power supply terminal of the second control circuit block 31, a VO terminal fed with a signal from an output voltage detection circuit 8, the VOUT terminal connected to the OUT terminal to the load, and a GND terminal which is the reference potential of the second control circuit block 31.

A regulator 32 of the second control circuit block 31 is made up of a starting constant current source 33 connected to the input terminal VIN2, a switch 34 connected between the constant current source 33 and a capacitor 12 connected to a VCC1 terminal, and a switch 35 connected between the capacitor 12 and the VOUT1 terminal.

When an input voltage is applied from an input terminal IN to the DRAIN terminal of the semiconductor package 30 at the start of the power supply, a regulator 13 of the first control circuit block 2 supplies a current to a capacitor 3 connected to the VDD terminal, so that a VDD terminal voltage increases. The switch of the regulator 13 is turned on and the regulator 13 continues supplying a starting current to the VDD terminal until the VDD terminal voltage reaches a constant voltage. When the VDD terminal voltage reaches the constant voltage, the switch of the regulator 13 is turned off to stop the supply of current to the VDD terminal, so that the VDD terminal voltage is kept at a constant potential.

At the same time, the constant current source 33 of the regulator 32 in the second control circuit block 31 supplies a current to the capacitor 12 connected to the VCC terminal, so that a VCC terminal voltage increases. The switch 34 of the regulator 32 is turned on and the regulator 32 continues supplying the starting current to the VCC terminal until the VCC terminal voltage reaches the constant voltage. When the VCC terminal voltage reaches the constant voltage, the switch 34 of the regulator 32 is turned off to stop the supply of current to the VCC terminal, so that the VCC terminal voltage is kept at the constant potential.

The starting voltage of the second control circuit block 31 is set lower than the starting voltage of the first control circuit block 2. Thus when the constant current sources of the regulator 13 and the regulator 32 have the same current capacity and the capacitor 3 and the capacitor 12 have equal capacitance values, the second control circuit block 31 can start to operate earlier than the first control circuit block 2.

When the VDD terminal voltage of the first control circuit block 2 reaches the starting voltage, a start/stop circuit 14 outputs a signal enabling the start of the on/off operation of the switching element 1. At the same time, the start/stop circuit 14 starts the operation of the constant current source for charging a capacitor 51 and releases the state of an FB terminal voltage having been fixed at VFB1 by a turned-on switch 46.

In the third embodiment, unlike in the first embodiment, it is not necessary to apply a dummy current IFB1 to a first feedback current control circuit 17 to make operable the first control circuit block 2. Thus the power consumption of the circuit can be reduced.

When the first control circuit block 2 starts the on/off operation of the switching element 1, the output voltage of the OUT terminal increases. When the output voltage reaches the constant voltage, the switch 34 in the regulator 32 of the second control circuit block 31 is turned off and the switch 35 starts supplying power from the VOUT terminal to the VCC terminal. The switch 35 operates so as to keep the VCC terminal voltage at the starting voltage or higher. When the output voltage is not higher than the constant voltage, for example, when the output is overloaded, the switch 35 is turned off and the switch 34 supplies power to the VCC terminal.

In a steady-state operation, power is supplied from the output voltage of the OUT terminal to the second control circuit block 31 and it is not necessary to supply power from the input voltage, thereby improving power conversion efficiency.

Fourth Embodiment

The following will describe a switching power supply and a semiconductor device according to a fourth embodiment of the present invention.

Figure 6:
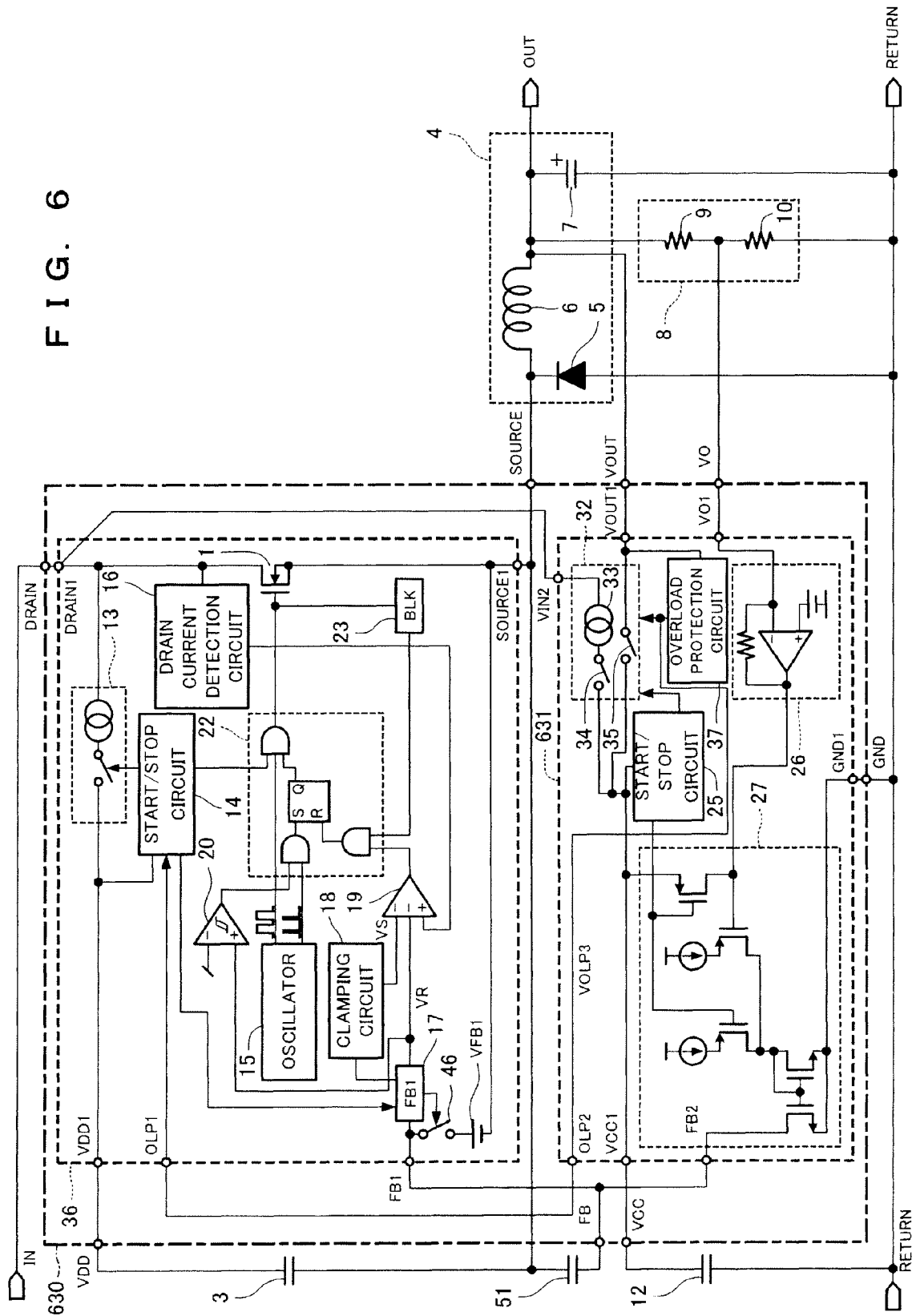
FIG. 6 is a circuit diagram showing a switching power supply and a semiconductor device according to a fourth embodiment of the present invention.

FIG. 6 is a circuit diagram showing the configurations of the switching power supply and the semiconductor device according to the fourth embodiment. As shown in FIG. 6, the fourth embodiment is different from the third embodiment in that in a semiconductor package (semiconductor device) 630, a second control circuit block 631 includes an overload protection circuit 37 for detecting an overload and an OLP2 terminal, the overload protection circuit 21 of FIG. 5 is omitted in a first control circuit block 36, and an OLP1 terminal is provided in the first control circuit block 36.

The overload protection circuit 37 in the second control circuit block 631 of FIG. 2 compares a VOUT terminal voltage and a predetermined reference voltage and outputs an overload protection signal VOLP3 to a regulator 32 and the OLP2 terminal. The OLP2 terminal of the second control circuit block 631 is connected to the OLP1 terminal of the first control circuit block 36, and the overload protection signal VOLP3 having been inputted to the OLP1 terminal of the first control circuit block 36 is inputted to a start/stop circuit 14 to suspend or stop the operation of a switching element 1. The overload protection signal VOLP3 may be inputted to an oscillator 15 to reduce a switching frequency (not shown).

Further, the start/stop circuit 14 transmits, to a first feedback signal control circuit 17, a signal for forcibly discharging an FB terminal and fixing the FB terminal at a VFB1 voltage, so that a feedback terminal voltage rapidly decreases. Thus a recovery operation from an overload stop state performs soft start as in normal start, achieving a safe recovery.

Signals are transmitted between the OLP1 terminal and the OLP2 terminal in the single semiconductor package 630, so that the signals are not affected by noise signals from the outside. Since it is possible to directly detect the voltage of the VOUT terminal connected to an output load and monitor a load condition, achieving an overload protection function with higher precision.

By providing a special OLP terminal, the overload protection of the switching element 1 can be performed without using a feedback current signal. Thus in a state in which a load peaks for a certain period, even when the feedback current signal decreases and a drain current passing through the switching element 1 reaches an overcurrent protection level ILIMIT, the state is not erroneously recognized as an overloaded state.

Fifth Embodiment

The following will describe a switching power supply and a semiconductor device according to a fifth embodiment of the present invention.

Figure 7:
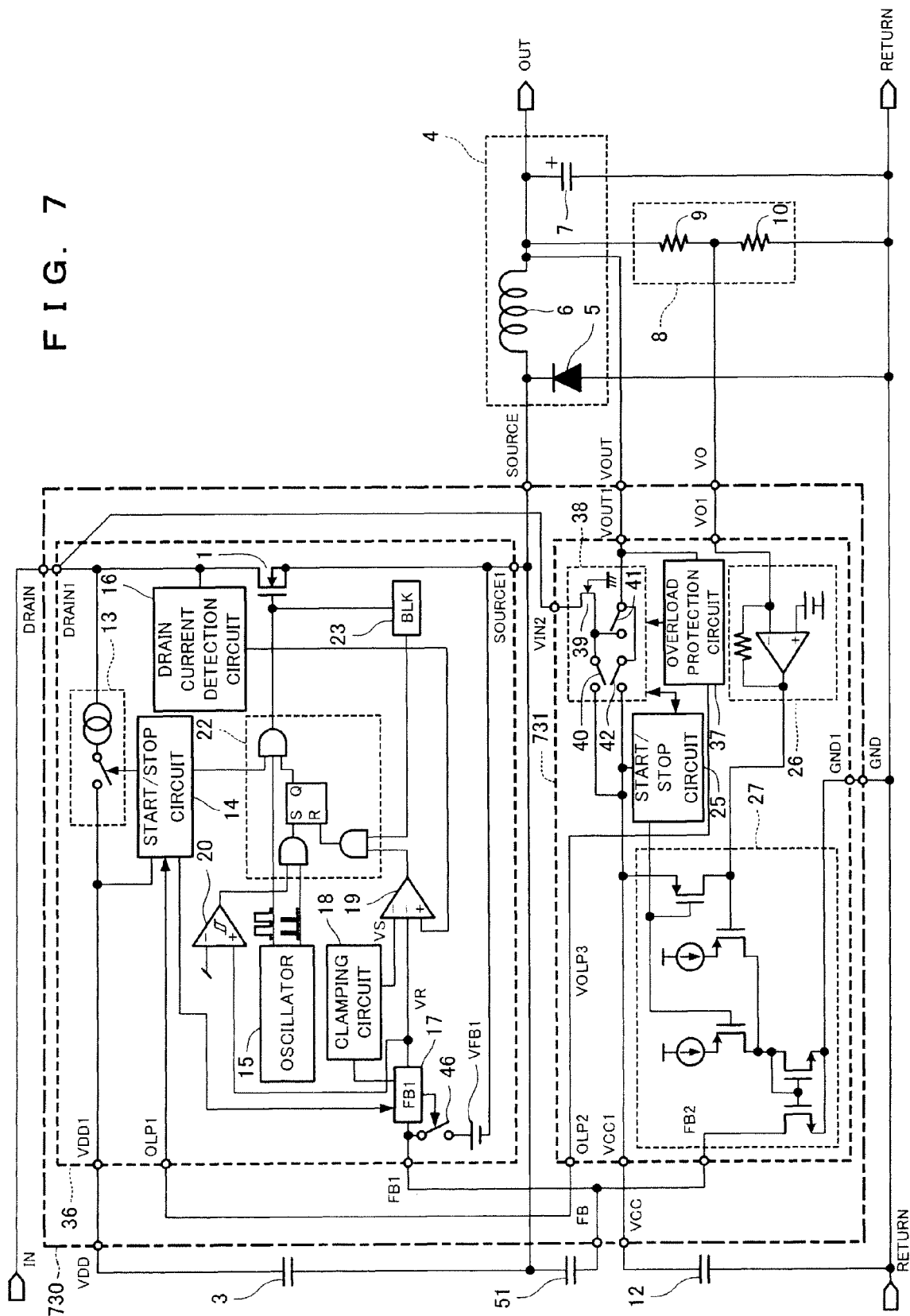
FIG. 7 is a circuit diagram showing a switching power supply and a semiconductor device according to a fifth embodiment of the present invention.

FIG. 7 is a circuit diagram showing the configurations of the switching power supply and the semiconductor device according to the fifth embodiment. As shown in FIG. 7, the fifth embodiment is different from the fourth embodiment in the configuration of a regulator 38 of a second control circuit block 731 in a semiconductor package (semiconductor device) 730.

The regulator 38 of the second control circuit block 731 in FIG. 7 is made up of a junction FET 39 which is connected to an input terminal VIN2 of the second control circuit block 731 and has the function of a starting constant current source and the function of clamping an output voltage, a switch 40 which is connected between the low-voltage output terminal of the junction FET 39 and a capacitor 12 connected to a VCC1 terminal, a switch 41 connected between the low-voltage output terminal of the junction FET 39 and a VOUT1 terminal, and a switch 42 connected between the capacitor 12 connected to the VCC1 terminal and the VOUT1 terminal.

In FIG. 7, when the voltage of an OUT terminal is lower than a constant value, for example, at power-on or when the OUT terminal is overloaded, an input voltage inputted from an input terminal IN to a DRAIN terminal is applied to the junction FET 39 of the regulator 38 connected to the input terminal (VIN2 terminal) of the second control circuit block 731. Since the switches 40 and 41 are turned on, current is supplied to the capacitor 12 connected to the VCC1 terminal and the OUT terminal voltage is increased through the VOUT1 terminal.

On the other hand, a second feedback signal control circuit 27 transmits a signal for stopping the on/off operation of a switching element 1, to a first feedback signal control circuit 17 of a first control circuit block 36 through an FB2 terminal and an FB1 terminal. When a VDD terminal voltage reaches a starting voltage, the first feedback signal control circuit 17 fixes an FB terminal voltage at VFB1 lower than a stabilized voltage VFB2 in a normal operation.

When a VCC terminal voltage reaches the starting voltage, the regulator 38 turns off the switch 40 to stop the supply of current to the capacitor 12, so that the VCC terminal voltage is kept at a constant potential. The junction FET 39 continues supplying current to the OUT terminal through the switch 41. When the supplied current increases the OUT terminal voltage above a predetermined first voltage, which is set higher than the starting voltage of the second control circuit block 731, the second feedback signal control circuit 27 supplies a dummy current IFB1 from the FB1 terminal to the FB2 terminal through a start/stop circuit 25. The dummy current IFB1 is a feedback signal for starting the on/off operation of the switching element 1.

When the second feedback signal control circuit 27 supplies the dummy current IFB1, the first feedback signal control circuit 17 detects that the dummy current IFB1 has been supplied through an FB terminal and outputs a signal enabling the start of the on/off operation of the switching element 1.

When the OUT terminal voltage is higher than the starting voltage of the second control circuit block 731 and a second voltage higher than the predetermined first voltage, the switches 40 and 41 are turned off and the turned-on switch 42 supplies current from a VOUT terminal to the capacitor 12, which is connected to the VCC1 terminal, based on the OUT terminal voltage.

With this configuration, power can be directly supplied from the input terminal (VIN2 terminal) to the second control circuit block 731 based on the input voltage to the input terminal IN, thereby reducing a power loss caused by a starting resistance and the like. It is therefore possible to achieve a switching power supply with higher power conversion efficiency.

Further, at power-on or during overload protection, power can be supplied to the OUT terminal from the output terminal of the junction FET 39 through the VOUT terminal while the switching element 1 is kept turned off, and it is possible to prevent an overcurrent from passing through the switching element at power-on or during overload protection.

Moreover, a period for protecting the switching element 1 from overcurrent (that is, a soft start period) does not depend on the settings of external components, signals from the outside, an internally generated time, and so on. In a steady-state operation in which the OUT terminal voltage is equal to or higher than a constant voltage, the power of the second control circuit block is supplied from the output voltage of the OUT terminal, thereby eliminating the need for power supply from the input voltage. It is therefore possible to further improve power conversion efficiency.

Sixth Embodiment

The following will describe a switching power supply and a semiconductor device according to a sixth embodiment of the present invention.

Figure 8:
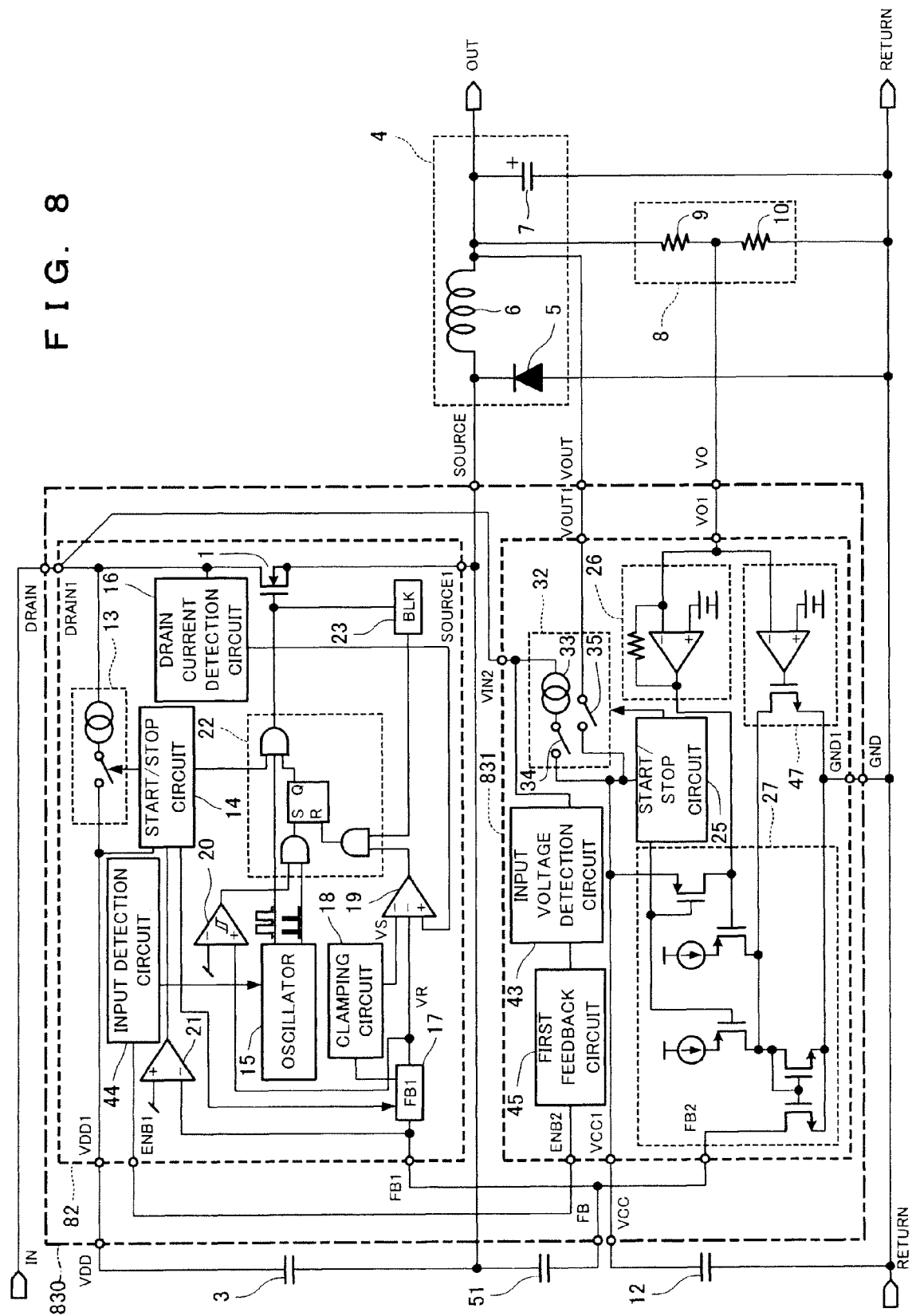
FIG. 8 is a circuit diagram showing a switching power supply and a semiconductor device according to a sixth embodiment of the present invention.

FIG. 8 is a circuit diagram showing the configurations of the switching power supply and the semiconductor device according to the sixth embodiment. As shown in FIG. 8, the sixth embodiment is different from the third embodiment in that in a semiconductor package (semiconductor device) 830, an input detection circuit 44 and an ENB1 terminal are added in a first control circuit block 82, the potential fixing switch 46 connected to the first feedback signal control circuit 17 of FIG. 5 is omitted, and an input voltage detection circuit 43, a first feedback circuit 45, a load detection circuit 47, and an ENB2 terminal are added in a second control circuit block 831.

The input voltage detection circuit 43 is connected to the input terminal (VIN2 terminal) of the second control circuit block 831, compares an input voltage from the VIN2 terminal with an internally set reference voltage, and outputs the comparison result to the first feedback circuit 45. The first feedback circuit 45 is connected to the ENB2 terminal and outputs a signal, which corresponds to the input voltage, to the ENB1 terminal of the first control circuit block 82 through the ENB2 terminal.

In FIG. 8, when the input voltage is low, the input detection circuit 44 in the first control circuit block 82 outputs a signal for gradually reducing an oscillatory frequency thereafter according to an increase in input voltage at high frequencies, to an oscillator 15 based on a signal inputted from the ENB1 terminal. When the input voltage reaches at least a predetermined reference voltage, the input voltage detection circuit 43 in the second control circuit block 831 outputs, to the first feedback circuit 45, a signal for fixing the oscillatory frequency. Thus the oscillatory frequency of the oscillator 15 is fixed at the oscillatory frequency of a steady state.

The load detection circuit 47 connected to a VO terminal compares the internally set reference voltage and a VO terminal voltage and outputs the comparison result to a second feedback signal control circuit 27. As a result, the second feedback signal control circuit 27 does not pass a feedback current signal to a first feedback signal control circuit 17 of the first control circuit block 82 when the VO terminal voltage is lower than the internally set reference voltage.

Thus the value of drain current passing through a switching element 1 is set at an overcurrent protection level ILIMIT determined by a clamping circuit 18. After that, as the VO terminal voltage increases, the peak value of drain current passing through the switching element 1 decreases.

When the VO terminal voltage reaches the internally set reference voltage thereafter, an output signal from the load detection circuit 47 becomes invalid and a feedback current signal is similarly outputted from the second feedback signal control circuit 27 based on an output signal from an error amplifier 26 connected to the VO terminal.

In a state in which an OUT terminal voltage is not lower than a desired voltage, when a load decreases and the OUT terminal voltage increases, the output voltage signal of the error amplifier 26 linearly decreases, a signal for increasing an FB terminal current is outputted from the second feedback signal control circuit 27, and the first feedback signal control circuit 17 reduces the voltage of an output signal VR.

The voltage of the output signal VR from the first feedback signal control circuit 17 is the reference voltage of a comparator 19. As the voltage of the output signal VR decreases, the peak value of the DRAIN current passing through the switching element 1 decreases, so that PWM control is performed according to a current mode.

In the foregoing structural example of the sixth embodiment, the second control circuit block 831 includes the input voltage detection circuit 43. Thus it is possible to detect the states of input voltage and output voltage all the time. The output voltage can be quickly raised by high-frequency driving in a period during which an input/output voltage difference is small.

In a chopper-type step-down switching power supply, the on-duty ratio of the switching element 1 is determined by an input/output voltage ratio. Thus even when a peak current value is set high relative to a small input/output voltage difference, the on-duty ratio of switching increases, so that the control of the peak current value is not disabled unlike in driving with the minimum pulse width.

Moreover, a period for starting the switching power supply while protecting the switching element 1 from overcurrent (that is, a soft start period) does not depend on the settings of external components, signals from the outside, an internally generated time, and so on.

Seventh Embodiment

The following will describe a switching power supply and a semiconductor device according to a seventh embodiment of the present invention.

Figure 9:
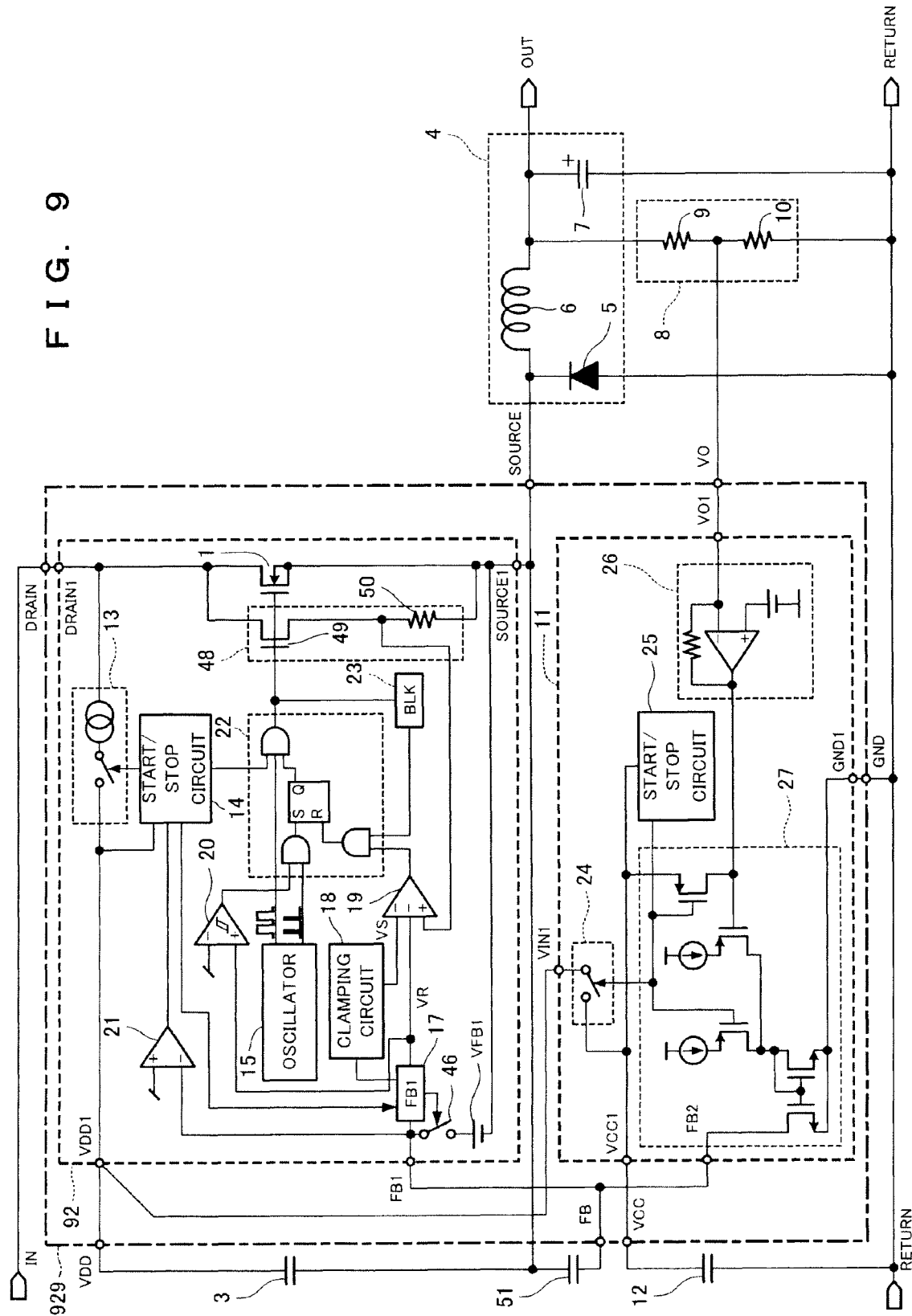
FIG. 9 is a circuit diagram showing a switching power supply and a semiconductor device according to a seventh embodiment of the present invention.
Figure 10:
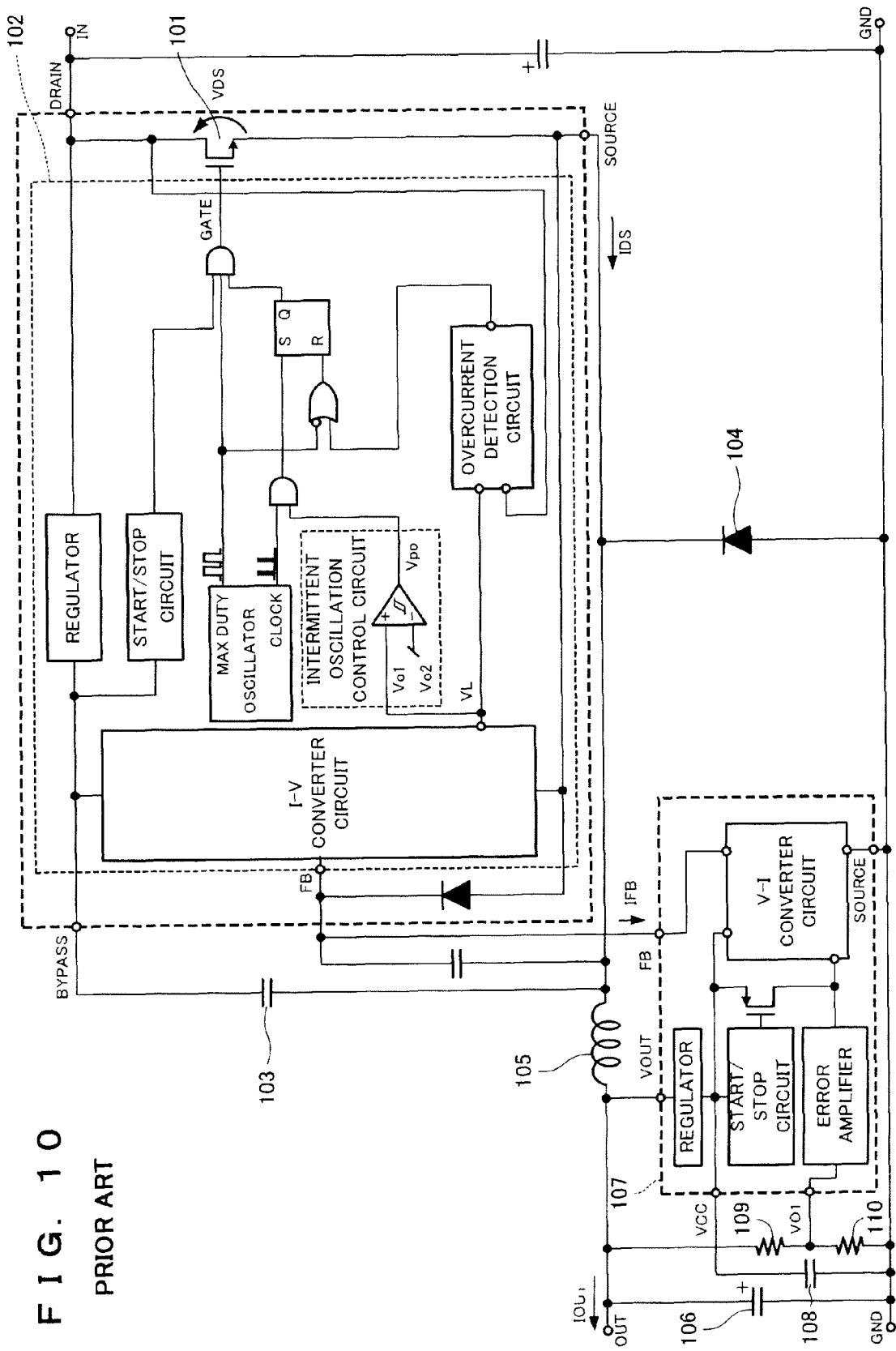
FIG. 10 is a circuit diagram showing a switching power supply according to the prior art.

FIG. 9 is a circuit diagram showing the configurations of the switching power supply and the semiconductor device according to the seventh embodiment. As shown in FIG. 9, the seventh embodiment is different from the first embodiment in a configuration and a method for detecting a current passing through a switching element 1 of a first control circuit block 92 in a semiconductor package (semiconductor device) 929.

The drain current detection circuit 16 of FIG. 1 detects the on voltage of the switching element 1, whereas a drain current detection circuit 48 of FIG. 9 is connected in parallel with the switching element 1 and is made up of a second switching element 49 to which a current smaller than a current passing through the switching element 1 is applied with a constant current ratio, and a resistor 50.

The input-side main terminal of the second switching element 49 is connected to the input-side main terminal of the switching element 1. The control terminal of the second switching element 49 is connected to the control terminal of the switching element 1. The output-side main terminal of the second switching element 49 is connected to one end of the resistor 50. The other end of the resistor 50 is connected to the output-side main terminal of the switching element 1.

The drain current detection circuit 48 of the seventh embodiment outputs a voltage, which is generated across the resistor 50 according to the value of current passing through the second switching element 49, to a comparator 19.

In a method of detecting the drain current of the switching element 1 by using the on voltage of the switching element 1 as shown in FIG. 1, the drain current cannot be accurately detected for a certain period (generally several hundreds nsec) after the switching element 1 changes from an off state to an on state, whereas in the seventh embodiment shown in FIG. 9, a drain current is detected according to a current passing through the resistor 50, so that the drain current can be reliably detected with high precision even immediately after the switching element 1 changes from the off state to the on state.

What is claimed is:

1. A switching power supply comprising:
a switching element connected between an input-side main terminal and a ground potential for turning a first DC voltage on or off;
a converter circuit connected between an output-side main terminal of the switching element and the ground potential for converting a current intermittently outputted from the output-side main terminal in response to an on/off operation of the switching element to a second DC voltage smaller in absolute value than the first DC voltage and outputting the second DC voltage;
a first control circuit block connected between the input-side main terminal and the output-side main terminal of the switching element for controlling the on/off operation of the switching element from a control terminal of the switching element;
a first capacitor connected between the first control circuit block and the output-side main terminal of the switching element for generating a power supply voltage of the first control circuit block;
an output voltage detection circuit for detecting the second DC voltage;
a second control circuit block connected among the input-side main terminal of the switching element, the second DC voltage, and the ground potential, for receiving an output voltage signal of the output voltage detection circuit, and outputting a feedback signal to the first control circuit block in response to a change of the output voltage signal to allow the first control circuit block to perform feedback control on the on/off operation of the switching element; and
a second capacitor connected between the second control circuit block and the ground potential for generating a power supply voltage of the second control circuit block,
wherein the first control circuit block and the second control circuit block are connected such that the first control circuit block has a reference potential on a higher voltage side than a reference potential of the second control circuit block, and
the first control circuit block for starting on/off operation of the switching element after the power supply voltage of the first control circuit block and the power supply voltage of the second control circuit block reach starting voltages and a feedback signal is inputted from the second control circuit block.

2. The switching power supply according to claim 1, wherein the first control circuit block comprises:
a first regulator which has one end connected to the input-side main terminal of the switching element and another end connected to the first capacitor, the first regulator for generating the power supply voltage of the first control circuit block;
a first starting voltage detection circuit for detecting that the power supply voltage of the first control circuit block has reached the starting voltage;
an oscillator circuit for outputting a pulse signal for generating a switching signal for turning the switching element on or off;
an element current detection circuit for detecting a current passing through the switching element and outputting the current as an element current detection signal;
a first feedback terminal fed with the feedback signal from the second control circuit block;
a first feedback signal control circuit for outputting a signal for controlling an amount of current and an output state of the switching signal in response to the feedback signal;
a clamping circuit for outputting a signal for fixing a maximum value of the element current detection signal from the element current detection circuit;
a comparator for performing an amplitude comparison between the element current detection signal from the element current detection circuit and a lower one of values of the output signal from the first feedback signal control circuit and the output signal from the clamping circuit, and outputting a comparison signal according to a comparison result; and
a switching signal control circuit for controlling the amount of current and the output state of the switching signal based on the comparison signal from the comparator,
the second control circuit block comprises:
a second regulator for generating the power supply voltage of the second control circuit block from the first DC voltage of the input-side main terminal of the switching element connected to a first input end and the second DC voltage of the converter circuit connected to a second input end, and supplying the power supply voltage to the second capacitor;
a second starting voltage detection circuit for detecting that the power supply voltage of the second control circuit block has reached the starting voltage;
a second feedback signal control circuit for comparing the output signal of the output voltage detection circuit and a predetermined reference voltage and outputting the feedback signal; and
a second feedback terminal for outputting the feedback signal from the second feedback signal control circuit,
wherein the starting voltage of the second control circuit block from the second regulator is lower than the starting voltage of the first control circuit block from the first regulator,
the second control circuit block first starts an operation at power-on,
the second control circuit block transmits the feedback signal to the first feedback terminal through the second feedback terminal, and the first control circuit block starts an operation after an output signal of the first starting voltage detection circuit and the feedback signal are both inputted.

3. The switching power supply according to claim 2, wherein the second regulator comprises:
a starting constant current source connected to an input terminal fed with the first DC voltage;
a switch for determining supply of an output from the starting constant current source to the second capacitor; and
a switch connected to an input terminal for receiving the second DC voltage and determining supply of the second DC voltage to the second capacitor,
wherein power is supplied from the first DC voltage to the second capacitor when the second DC voltage is lower than a constant value, and
supply from the first DC voltage is shut down to supply power from the second DC voltage to the second capacitor when the second DC voltage is higher than the constant value.

4. The switching power supply according to claim 2, wherein the first regulator comprises at least a starting constant current source and a switch for determining power supply to the first capacitor,
the first control circuit block comprises a light-load oscillation control circuit for stopping the on/off operation of the switching element when an output voltage of the first feedback signal control circuit is lower than an internally specified lower limit voltage value of a light-load reference voltage source, and restarting the on/off operation of the switching element when the output voltage is higher than an upper limit voltage of the light-load reference voltage source,
the first feedback signal control circuit comprises a device for fixing, before startup prior to transmission of the feedback signal from the second control circuit block, a potential of the first feedback terminal at a preset voltage determined based on the reference potential of the first control circuit block,
fixation is released when the first control circuit block becomes operable, and the on/off operation of the switching element is started from a state in which the output signal from the first feedback signal control circuit decreases to a same voltage as the light-load reference voltage source.

5. The switching power supply according to claim 2, wherein the second control circuit block comprises an error amplifier for comparing the output signal of the output voltage detection circuit and the predetermined reference voltage and amplifying a potential difference,
converts an output voltage of the error amplifier to a current, and
outputs the current as the feedback signal,
wherein the first feedback signal control circuit charges a third capacitor, connected between the first feedback terminal and the output-side main terminal of the switching element, by a voltage corresponding to a drawing current value of the feedback signal, and
comprises a constant current source for charging the third capacitor when the feedback signal is not supplied, and
an oscillatory frequency of the oscillator circuit for turning the switching element on or off is reduced or an oscillation is stopped when a voltage of the first feedback terminal is increased and a signal of the first feedback terminal reaches at least a predetermined voltage.

6. The switching power supply according to claim 2, wherein the second control circuit block comprises an overload protection circuit for shutting down supply from the second DC voltage, supplying power from the first DC voltage to the second capacitor, detecting a load condition as an overloaded state, and outputting an overload protection signal when the second DC voltage is lower than a constant value during a normal operation, and the second control circuit block outputs the feedback signal for reducing an oscillatory frequency of the oscillator circuit for turning the switching element on or off or stopping an oscillation in a period during which the overload protection signal is outputted from the overload protection circuit.

7. The switching power supply according to claim 2, wherein the second regulator comprises:

a junction FET which is connected to an input terminal fed with the first DC voltage;

a switch for determining supply of an output from the junction FET to the second capacitor;

a switch connected to an input/output terminal to and from which the second DC voltage is inputted and outputted for determining supply of the second DC voltage to the second capacitor; and a switch for determining connection of the output of the junction FET to the input/output terminal to and from which the second DC voltage is inputted and outputted, when the second DC voltage is lower than a constant value, power is supplied from the first DC voltage to the second capacitor and the second DC voltage is supplied through the input/output terminal, the feedback signal for transmitting a stop of the on/off operation of the switching element is outputted to the first control circuit block, when the second DC voltage is higher than a predetermined first voltage, the feedback signal for transmitting start of the on/off operation of the switching element is outputted to the first control circuit block, when the second DC voltage is higher than a predetermined second voltage, supply from the first DC voltage is shut down and power is supplied from the second DC voltage to the second capacitor.

8. The switching power supply according to claim 2, wherein the second control circuit block comprises:

an input voltage detection circuit for comparing the first DC voltage and the predetermined reference voltage;

a first feedback circuit for outputting an output signal of the input voltage detection circuit as a first feedback signal to the first control circuit block;

a load detection circuit for comparing the output signal of the output voltage detection circuit and the predetermined reference voltage;

an error amplifier for comparing the output signal of the output voltage detection circuit and the predetermined reference voltage and amplifying a potential difference; and a second feedback signal control circuit for converting an output signal of the load detection circuit and an output voltage of the error amplifier to current and outputting a second feedback signal, wherein the first control circuit block comprises an input detection circuit which is fed for receiving the signal from the first feedback circuit and outputting the signal to the oscillator circuit, when the second control circuit block reaches the starting voltage, the first feedback circuit detects a state of the first DC voltage and the second feedback signal control circuit detects a state of the second DC voltage, when the first DC voltage and the second DC voltage are lower than the reference voltages, an oscillatory frequency of the oscillator circuit according to the on/off operation of the switching element is increased and the feedback signal is outputted with the element current detection signal set at a value of the output signal from the clamping circuit, as the first DC voltage and the second DC voltage increase, the feedback signal is outputted to gradually reduce the oscillatory frequency corresponding to the on/off operation of the switching element and the output signal of the element current detection circuit, when the first DC voltage reaches the predetermined reference voltage, the oscillatory frequency corresponding to the on/off operation of the switching element is fixed, and when the second DC voltage reaches the predetermined reference voltage, the second feedback signal control circuit outputs the feedback signal for controlling a peak current value of the switching element such that the second DC voltage is kept at a desired voltage thereafter.

9. A semiconductor device in which the switching power supply according to claim 2 has a partially integrated functional part, wherein in the first control circuit block, the input-side main terminal of the switching element and one end of the first regulator of the first control circuit block are connected in common, the output-side main terminal of the switching element and a reference potential terminal of the first control circuit block are connected in common, at least four terminals are integrated as external connection terminals on a same first semiconductor substrate, the terminals including the input-side main terminal of the switching element, the output-side main terminal of the switching element, a terminal for connecting the first capacitor, and a terminal for connecting the first feedback terminal, and in the second control circuit block, at least six terminals are integrated as external connection terminals on a same second semiconductor substrate, the terminals including an input terminal to which the input-side main terminal of the switching element and one end of the second regulator are connected in common, a terminal to which the other end of the second regulator and the second capacitor are connected, an input/output terminal to and from which the second DC voltage is inputted and outputted, a terminal fed with the output signal of the output voltage detection circuit, a terminal for connecting the second feedback terminal, and a terminal connected to the ground potential, the input-side main terminal of the switching element and the input terminal of the second control circuit block are connected in common, and the first feedback terminal and the second feedback terminal are connected in common and are mounted in a package having at least eight terminals.

10. The semiconductor device according to claim 9, wherein the first feedback terminal and the second feedback terminal connected in common have a terminal voltage kept at a constant potential higher than a potential fixed before startup, in order to stabilize a normal on/off operation.

11. A switching power supply, comprising:

a switching element connected between an input-side main terminal and a ground potential for turning a first DC voltage on or off;

a converter circuit connected between an output-side main terminal of the switching element and the ground potential for converting a current intermittently outputted from the output-side main terminal in response to an on/off operation of the switching element to a second DC voltage smaller in absolute value than the first DC voltage and outputting the second DC voltage;

a first control circuit block connected between the input-side main terminal and the output-side main terminal of the switching element for controlling the on/off operation of the switching element from a control terminal of the switching element;

a first capacitor connected between the first control circuit block and the output-side main terminal of the switching element for generating a power supply voltage of the first control circuit block;

an output voltage detection circuit for detecting the second DC voltage;

a second control circuit block connected between a contact between the first control circuit block and the first capacitor and the ground potential, for receiving an output voltage signal of the output voltage detection circuit, and outputting a feedback signal to the first control circuit block in response to a change of the output voltage signal to allow the first control circuit block to perform feedback control on the on/off operation of the switching element; and a second capacitor connected between the second control circuit block and the ground potential for generating a power supply voltage of the second control circuit block, wherein the first control circuit block and the second control circuit block are connected such that the first control circuit block has a reference potential on a higher voltage side than a reference potential of the second control circuit block, and the first control circuit block for starting on/off operation of the switching element after the power supply voltage of the first control circuit block and the power supply voltage of the second control circuit block reach starting voltages and a feedback signal is inputted from the second control circuit block, wherein the first control circuit block comprises:

a first regulator which has one end connected to the input-side main terminal of the switching element and another end connected to the first capacitor, the first regulator for generating the power supply voltage of the first control circuit block;

a first starting voltage detection circuit for detecting that the power supply voltage of the first control circuit block has reached the starting voltage;

an oscillator circuit for outputting a pulse signal for generating a switching signal for turning on/off the switching element;

an element current detection circuit for detecting a current passing through the switching element and outputting the current as an element current detection signal;

a first feedback terminal for receiving the feedback signal from the second control circuit block;

a first feedback signal control circuit for outputting a signal for controlling an amount of current and an output state of the switching signal in response to the feedback signal;

a clamping circuit for outputting a signal for fixing a maximum value of the output signal from the first feedback signal control circuit;

a comparator for performing an amplitude comparison between the element current detection signal from the element current detection circuit and a lower one of values of the output signal from the first feedback signal control circuit and the output signal from the clamping circuit, and outputting a comparison signal according to a comparison result; and a switching signal control circuit for controlling the amount of current and the output state of the switching signal based on the comparison signal from the comparator, wherein the second control circuit block comprises:

a second regulator which has one end connected to a contact between the first regulator and the first capacitor and another end connected to the second capacitor, the second regulator for generating the power supply voltage of the second control circuit block;

a second starting voltage detection circuit for detecting that the power supply voltage of the second control circuit block has reached the starting voltage;

a second feedback signal control circuit for comparing the output signal of the output voltage detection circuit and a predetermined reference voltage and outputting the feedback signal; and a second feedback terminal for outputting the feedback signal from the second feedback signal control circuit, the second control circuit block for transmitting a feedback signal to the first feedback terminal through the second feedback terminal, and the first control circuit block for starting an operation after an output signal of the first starting voltage detection circuit and the feedback signal are both inputted.

12. The switching power supply according to claim 11, wherein the first regulator comprises at least a starting constant current source and a switch for determining power supply to the first capacitor, the second regulator comprises at least a switch for determining power supply to the second capacitor, the first control circuit block comprises a light-load oscillation control circuit for stopping the on/off operation of the switching element when an output voltage of the first feedback signal control circuit is lower than an internally specified lower limit voltage value of a light-load reference voltage source, and restarting the on/off operation of the switching element when the output voltage is higher than an upper limit voltage of the light-load reference voltage source, the first feedback signal control circuit comprises a device for fixing, before startup prior to transmission of the feedback signal from the second control circuit block, a potential of the first feedback terminal at a preset voltage determined based on the reference potential of the first control circuit block, fixation is released when the first control circuit block becomes operable, and the on/off operation of the switching element is started from a state in which the output signal from the first feedback signal control circuit decreases to a same voltage as the light-load reference voltage source.

13. The switching power supply according to claim 11, wherein the second control circuit block comprises an error amplifier for comparing the output signal of the output voltage detection circuit and the predetermined reference voltage and amplifying a potential difference, converts an output voltage of the error amplifier to a current, and outputs the current as the feedback signal, the first feedback signal control circuit charges a third capacitor, which is connected between the first feedback terminal and the output-side main terminal of the switching element, by a voltage corresponding to a drawing current value of the feedback signal, and comprises a constant current source for charging the third capacitor when the feedback signal is not supplied, and an oscillatory frequency of the oscillator circuit for turning the switching element on or off is reduced or an oscillation is stopped when a voltage of the first feedback terminal is increased and a signal of the first feedback terminal reaches at least a predetermined voltage.

14. The switching power supply according to claim 11, wherein the second control circuit block comprises an overload protection circuit for detecting a load condition as an overloaded state and outputting an overload protection signal when the output signal of the output voltage detection circuit has a voltage lower than a second reference voltage which is lower than a lower limit value of the reference voltage of the second feedback signal control circuit, and the second control circuit block outputs the feedback signal for reducing an oscillatory frequency of the oscillator circuit for turning the switching element on or off or stopping an oscillation in a period during which the overload protection signal is outputted from the overload protection circuit.

15. The switching power supply according to claim 11, wherein the converter circuit is made up of a series connected circuit of a diode, a coil, and a capacitor.

16. The switching power supply according to claim 11, wherein the element current detection circuit detects a current passing through the switching element, based on an on voltage.

17. The switching power supply according to claim 11, wherein in the first control circuit block, the element current detection circuit is made up of:

a second switching element to be turned on/off in a similar manner to the switching element, for receiving a current smaller than a current passing through the switching element, and having a constant current ratio relative to the current passing through the switching element; and a resistor connected in series between another end of the second switching element and the reference potential of the first control circuit block, wherein a voltage across the resistor is detected as the element current detection signal.

18. A semiconductor device including a switching power supply, the switching power supply comprising:

a switching element connected between an input-side main terminal and a ground potential to turn a first DC voltage on or off;

a converter circuit connected between an output-side main terminal of the switching element and the ground potential for converting a current intermittently outputted from the output-side main terminal in response to an on/off operation of the switching element to a second DC voltage smaller in absolute value than the first DC voltage and outputting the second DC voltage;

a first control circuit block connected between the input-side main terminal and the output-side main terminal of the switching element for controlling the on/off operation of the switching element from a control terminal of the switching element;

a first capacitor connected between the first control circuit block and the output-side main terminal of the switching element for generating a power supply voltage of the first control circuit block;

an output voltage detection circuit for detecting the second DC voltage;

a second control circuit block connected between a contact between the first control circuit block and the first capacitor and the ground potential, for receiving an output voltage signal of the output voltage detection circuit, and outputting a feedback signal to the first control circuit block in response to a change of the output voltage signal to allow the first control circuit block to perform feedback control on the on/off operation of the switching element; and a second capacitor connected between the second control circuit block and the ground potential for generating a power supply voltage of the second control circuit block, wherein the first control circuit block and the second control circuit block are connected such that the first control circuit block has a reference potential on a higher voltage side than a reference potential of the second control circuit block, and the first control circuit block starts the on/off operation of the switching element after the power supply voltage of the first control circuit block and the power supply voltage of the second control circuit block both reach starting voltages and the feedback signal is inputted from the second control circuit block, wherein the first control circuit block comprises:

a first regulator which has one end connected to the input-side main terminal of the switching element and another end connected to the first capacitor, the first regulator for generating the power supply voltage of the first control circuit block;

a first starting voltage detection circuit for detecting that the power supply voltage of the first control circuit block has reached the starting voltage;

an oscillator circuit for outputting a pulse signal for generating a switching signal for turning the switching element on or off;

an element current detection circuit for detecting a current passing through the switching element and outputting the current as an element current detection signal;

a first feedback terminal for receiving the feedback signal from the second control circuit block;

a first feedback signal control circuit for outputting a signal for controlling an amount of current and an output state of the switching signal in response to the feedback signal;

a clamping circuit for outputting a signal for fixing a maximum value of the output signal from the first feedback signal control circuit;

a comparator for performing an amplitude comparison between the element current detection signal from the element current detection circuit and a lower one of values of the output signal from the first feedback signal control circuit and the output signal from the clamping circuit, and outputting a comparison signal according to a comparison result; and a switching signal control circuit for controlling the amount of current and the output state of the switching signal based on the comparison signal from the comparator, the second control circuit block comprises:

a second regulator which has one end connected to a contact between the first regulator and the first capacitor and another end connected to the second capacitor, the second regulator for generating the power supply voltage of the second control circuit block;

a second starting voltage detection circuit for detecting that the power supply voltage of the second control circuit block has reached the starting voltage;

a second feedback signal control circuit for comparing the output signal of the output voltage detection circuit with a predetermined reference voltage and outputting the feedback signal; and
a second feedback terminal for outputting the feedback signal from the second feedback signal control circuit,
wherein the second control circuit block transmits the feedback signal to the first feedback terminal through the second feedback terminal, and
the first control circuit block starts an operation after an output signal of the first starting voltage detection circuit and the feedback signal are inputted,
wherein the switching power supply has a partially integrated functional part,
wherein in the first control circuit block, the input-side main terminal of the switching element and one end of the first regulator of the first control circuit block are connected in common,
the output-side main terminal of the switching element and a reference potential terminal of the first control circuit block are connected in common,
at least four terminals are integrated as external connection terminals on a same first semiconductor substrate,
the terminals including the input-side main terminal of the switching element, the output-side main terminal of the switching element, a terminal for connecting the first capacitor, and a terminal for connecting the first feedback terminal, and
in the second control circuit block, at least five terminals are integrated as external connection terminals on a same second semiconductor substrate,
the terminals including an input terminal to which one end of the second regulator is connected, a terminal to which the other end of the second regulator and the second capacitor are connected, a terminal fed with the output signal from the output voltage detection circuit, a terminal for connecting the second feedback terminal, and a terminal connected to the ground potential,
the terminal for connecting the first capacitor and the input terminal of the second control circuit block are connected in common, and the first feedback terminal and the second feedback terminal are connected in common and are mounted in a package having at least seven terminals.

19. The semiconductor device according to claim 18, wherein the converter circuit is made up of a series connected circuit of a diode, a coil, and a capacitor.

20. The semiconductor device according to claim 18, wherein the element current detection circuit detects a current passing through the switching element, based on an on voltage.

21. The semiconductor device according to claim 18, wherein in the first control circuit block, the element current detection circuit is made up of:
a second switching element for turning on or off in a similar manner to the switching element, for receiving a current smaller than a current passing through the switching element, and having a constant current ratio relative to the current passing through the switching element; and
a resistor connected in series between another end of the second switching element and the reference potential of the first control circuit block,
wherein a voltage across the resistor is detected as the element current detection signal.

\* \* \* \* \*